(12) United States Patent
Follendore, III

(10) Patent No.: US 6,802,013 B1
(45) Date of Patent: Oct. 5, 2004

(54) CRYPTOGRAPHIC ACCESS AND LABELING SYSTEM

(76) Inventor: Roy D. Follendore, III, 11611 Olympic Dr., Manassas, VA (US) 22111

( * ) Notice: Subject to any disclaimer, the term of this patent is extended or adjusted under 35 U.S.C. 154(b) by 0 days.

(21) Appl. No.: 09/404,794

(22) Filed: Sep. 24, 1999

Related U.S. Application Data

(63) Continuation of application No. 08/457,489, filed on Jun. 1, 1995.

(51) Int. Cl.[7] ............................................... H04L 9/00
(52) U.S. Cl. ...................................... 713/201; 713/202
(58) Field of Search ................................ 713/200–202, 713/170, 104, 160, 162, 165, 168–169; 380/273, 264, 280; 709/225, 232, 238, 315

(56) References Cited

U.S. PATENT DOCUMENTS

| | | | | |
|---|---|---|---|---|
| 5,319,562 A | * | 6/1994 | Whitehouse | 364/464.03 |
| 5,638,512 A | * | 6/1997 | Osman et al. | 713/201 |
| 5,671,283 A | * | 9/1997 | Michener et al. | 713/161 |
| 5,678,046 A | * | 10/1997 | Cahill et al. | 395/616 |
| 5,680,452 A | * | 10/1997 | Shanton | 380/4 |
| 5,715,397 A | * | 2/1998 | Ogawa et al. | 709/246 |
| 5,764,762 A | * | 6/1998 | Kazmierczak et al. | 705/52 |
| 6,456,729 B1 | * | 9/2002 | Moore | 382/103 |

* cited by examiner

Primary Examiner—Kim Vu
Assistant Examiner—Leynna Ha
(74) Attorney, Agent, or Firm—Harold L. Novick

(57) ABSTRACT

An integrated, modular computer program system provides for the encryption and decryption of files utilizing conventional encryption algorithms and a relational key generated by the system. The computer program system also generates a series of labels that are encrypted and appended as a trailer to the encrypted message. The encrypted labels provide a history behind the particular encryption and they can be individually selected, separated, and decrypted from the total file. A rule based expert system is utilized as an intelligent label selection system to minimize message sensitivity. An access control module permits a user with a preassigned passphrase to have access to the encryption or decryption portion of the program by comparing a generated vector or key with a partially decrypted version of a second vector or key stored on a portable storage medium such as a floppy disk. If successful, the access control module creates a main key that is then used throughout the remainder of the program to encrypt or decrypt the labels. Part of the encryption or decryption process utilizes an internal, reproducible, but not reversible scrambling subroutine in which the bytes of an initializing vector are successively Exclusive ORed with one another and then the result concatenated to the initializing vector until all of the bytes have been so treated, and then the process repeated an integral number of times depending upon an input variable called a spinup number.

28 Claims, 25 Drawing Sheets

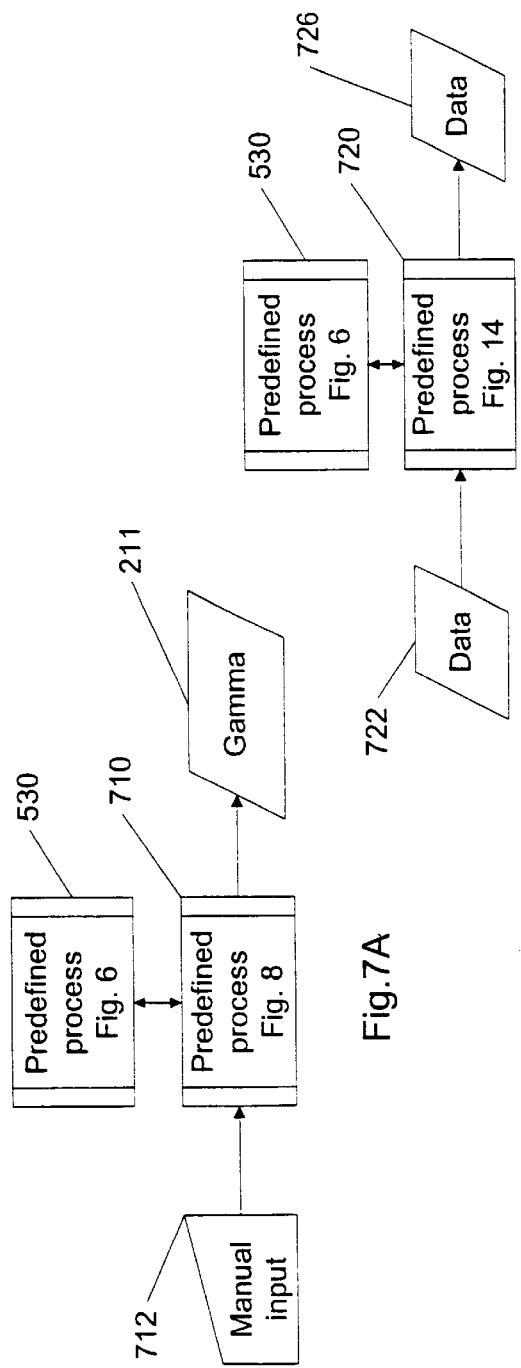
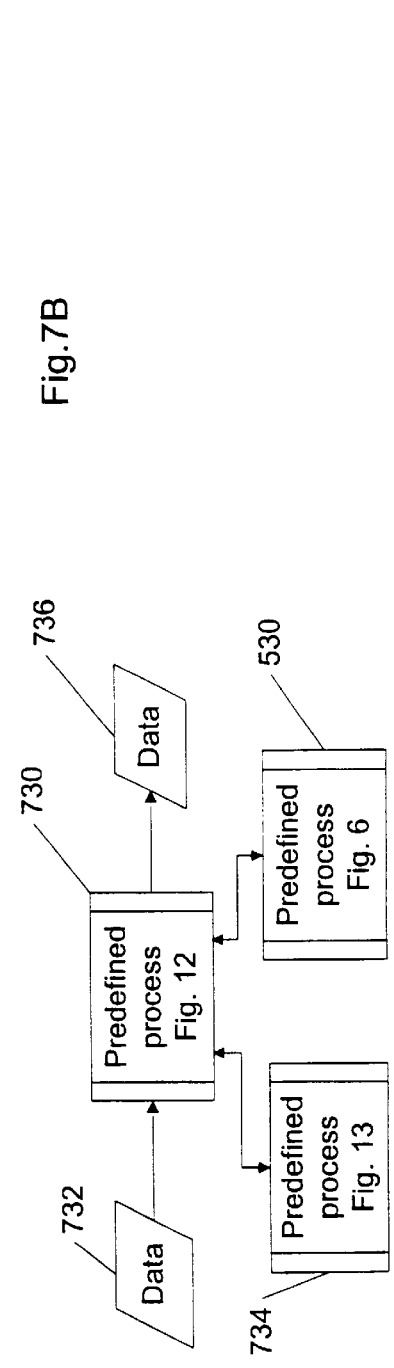
Fig.7A
Fig.7B
Fig.7C

CRYPTOGRAPHIC ACCESS AND LABELING SYSTEM

This application is a continuing application of U.S. patent application Ser. No. 08/457,489, filed Jun. 1, 1995, the entire contents of which are hereby incorporated in their entirety.

FIELD OF THE INVENTION

This invention relates in general to a cryptographic control system. Many encryption systems use a publicly known mathematical encryption algorithm that is initialized with a privately known, secret key or vector. The present invention in particular relates to a system of managing the encrypting keys, which is one of the means by which access to private information protected by cryptography is controlled. Because keys or vectors are usually lengthy alphanumeric numbers that are difficult to remember, many encryprtion systems use a rememberable word or phrase, called passwords or passphrases, respectively, to initiate a key generation system. The present invention also relates to a computer program and a programmed computer system which permits or denies access to protected data by the use of a passphrase. Sophisticated encryption systems usually, use labels, which are words or information that are related to the message being encrypted, that are encrypted and removeably, attached to the message. The present invention also relates to a commuter program and a programmed computer system that generates encrypted labels for attachment to a message as a header or trailer thereof. In addition, the present invention is related to a computer program and a programmed computer system that can reverse the process and decrypt a message, including the label information.

BACKGROUND OF THE INVENTION

Commercial privacy systems utilize cryptographic algorithms to protect information and limit access thereto. A standard cryptographic algorithm is the Data Encryption Standard ("DES"). As such, cryptographic privacy systems permit individuals within an organization to encode plain text information into "cipher text" using a cryptographic key. Cipher text is mixed up and unreadable. In an encrypted computer system, cipher text characters may be any of the standard ASCII characters that are used in modern computer systems.

A cryptographic process which produces cipher text is reversible and through the use of the appropriate key which was used to encrypt the plain text, can be regenerated by a person having that key into the original plain text form. Except for being unreadable, cipher text can be stored and transferred and manipulated just like any other file or data. By keeping the key and the identity of the cryptographic algorithm a secret, the ciphered text is kept from being unscrambled.

In addition to the difficulties of encrypting and decrypting plain text, there is also the problem of designating which ones of a number of organizations and divisions within those organizations, as well as the particular people in those divisions, who can have controlled, controllable access to written information and on-line communications obviously, a unique key can be used for each particular text and each particular use of that text. However, this gives rise to a tracking process that must be applied in order to keep track of the unique keys. This function or role is called key management. It can be manually intensive and it certainly affects organizational performance. Thus, key management is often the most costly part of an organizational security system.

The value of the performance of a key management system is the value of important organizational information reaching the right people at the right time in the right way. When there are a number of large groups of people communicating private or sensitive information that needs to be protected, tracking which of each of the unique keys that is used, by whom used, and the rationale for the use of a particular key is a difficult part of the key management process.

As a result of the complex array of keys necessary for such a large number of people divided into different, often overlapping, and often changing groups, who communicate for divergent reasons through many dynamic multi-media methods, key management is made extremely difficult if not nearly impossible. Additionally, the tracking of the key represented a simple assignment process of assigning a particular key to a project or to a particular station with no verification of the justification of the creation, generation or use of that key. In other words, once a key is generated, the reasons for its generation are often lost. It is just this independent tracking of keys which makes the conventional key management systems extremely difficult to maintain.

Thus, there is a need for a key management system which will not only keep track of the keys which are used with a particular message, but will also maintain the justification for the use of that key and the justification for the different categories of personnel access and the criteria used for selecting the communications system.

The principle problems with the use of traditional cryptographic systems today concerns their use that is associated with the context, intent and sensitivity of the information being distributed and stored using modern desktop multimedia methods. However, because the skill of the user of the information is usually non-technical, a very simplified, computerized system is needed to accomplish these purposes. The data or information being transmitted may have a substantial representation of rationality, but is incomplete because it can only convey self-referenced and internal information. The data may also not be complex enough to provide external references necessary for communicating the inferential components that provide the reason for the data and communication. There is thus also the need for a means to apply external rationalization for the purposes and use of the data or information.

In today's communication environment, a desktop multimedia system generates a very large amount of information, much of which may be sensitive, and all of which needs to be passed through inter-organizational networks and intra-organizational subnetworks. To some degree, all organizations require the compartmentalization of different types of information. The organizations have requirements for multilevel access to some or all of the sensitive information and the concept of that access usually involves a consideration of the need and capability of an individual to access the particular information. On the other hand, any information access limiting system cannot be so cumbersome or difficult to use that as a minimum discourages the use or access of the information and at the maximum prevents its access and utilization.

There is thus the need for an object oriented key management philosophy in which the data or information carries with it its reason for being and the rationale for access to it. This is sometimes called the need for a secured signature of the rational link between the key used in the algorithm and the cipher text product or its use.

Standard cryptographic privacy systems are traditionally based on manually indexed associations between an irrational key and often some narrow reason for its use. Keys are chosen from essentially random numbers and are used to initialize pointers in a cryptographic algorithm. Often, such keys are generated by a random number generator and are not known to the user, but are instead buried in the particular computer program which that user is using obviously, this type of system has the disadvantage in that the key is integral to the system which is generating or transmitting the data or information. By using an irrational key, that is a key comprised of characters which together have no meaning, it is very difficult to keep track of the reason for the existence of that key. With time, associated with situational conditions, the association between the reasons for the generation of the key and the data degenerates.

Furthermore, cryptographic keys are usually managed under systems that generally provide only a static distribution means. Keys are reused for significant periods of time for many reasons and for many types of messages. Traditional privacy systems are periodically secured, but not transactionally secured. This results in the privacy keys remaining the same for each message passed through a communications node during a defined period of time. Sometimes, keys are expected to be used from 180 days to years, during which time all messages stored or moved use the same key. During this period windows of opportunities exist to exploit "protected" traffic, if one obtains the correct key(s).

Closely associated with the concept of keys is the concept of passwords, passphrases, and labels. Whereas many cryptographic systems utilize irrational numbers for keys, other systems use as an input a password or passphrase which is then encoded, manipulated, or translated into a key. Passwords and phrases are usually in the form of words or a number of words which have a rational meaning and thus are easy to remember. In addition, because they can be longer strings of characters, they have a cryptographic advantage because there are more characters to work with. For example, a passphrase can be simply "The rain in Spain" which is concatenated to be "THERAININSPAIN." On the other hand, a password could just be the word "Spain" or "rain". Because passwords and passphrases have meaning, as indicated above, they are called or defined at least herein as being "rational." On the other hand, bank accountant numbers and a group of numbers and letters randomly generated (e.g. OX342PN17) are called or defined at least herein as being "irrational" because they have no internal meaning.

The prior art is replete with cryptographic data management systems which attempt to address one or more of the foregoing problems. Generally however, none of these references totally satisfies the requirements of modern communications with a large number of messages, a large number of senders and receivers, a large number of places to which the messages are sent, and an efficient and easy to use tracking system. Furthermore, these references also generally do not address the problem of regulating user access to the data in an efficient, yet secure way. Example of such prior art references are mentioned below and are incorporated herein by reference. Such references also disclose background information relevant to the present invention.

The United States Pond et al U.S. Pat. No. 4,864,616 discloses a method of cryptographically labelling electronically stored data in which a plurality of key streams are utilized. An encryption and decryption method utilizes reproducible mathematical functions such as an EXCLUSIVE OR mathematical methodology and incorporates a label that contains encrypting and decrypting information which is added to the header of the file. The label is also used for controlling access to the file and verifying the integrity of the file. The patent also discloses encrypting and decrypting the labels separately from the file itself.

A similar cryptographic system is disclosed in the Preston et al U.S. Pat. No. 5,052,040. This patent discloses a system and method of utilizing a plurality of labels that includes the configuration that the file was created on, the owner of the file, the machine that it was created on, and any special algorithms that may be used on the files. The label also contains a plurality of unique I.D.'s for each of the users that has access to the file. Obviously, such a system would have limitations where there was a large number of users. As in the Pond et al patent mentioned above, the method and system of the Preston et al patent encrypts the label information.

There are many methods that are available for reversibly altering a key or label. A common method is to use the EXCLUSIVE OR function, sometimes referred to simply as the XOR function. The Smith, Sr., et al. U.S. Pat. No. 5,214,698 discloses putting a key into multiple parts which are XORed of a key part with a proper control vector.

The United States Patents to Greenberg U.S. Pat. No. 5,220,606 and to Matyas et al. U.S. Pat. No. 4,993,069 disclose cryptographic techniques which utilize control vectors or labels for use with encoding keys or for controlling access to the system.

A recently issued United States patent to the present inventor U.S. Pat. No. 5,369,707 discloses a somewhat different key management rational that utilizes a separately encrypted header which in turn contains routing information about the message. The header is also used to generate a key used in the encryption-decryption process.

SUMMARY OF THE INVENTION

The present invention provides a computerized key management system that is inexpensive, automated, and increases organizational performance. It is decentralized to the individual communicating elements, yet it is completely capable of managing and minimizing sensitive data flow across inter and intra organizational information systems. It provides a low cost rational solution with a maximum of flexibility and a maximum of security.

A primary objective of the present invention is to support the privacy of local area networks and modem user groups through controlled compartmentalization and privatization of information. A principal objective is to minimize organizational information sensitivities through enforced information specification and information flow control. A user given access to a single custom label addressing set for private communications is able to communicate privately with managers who are given a "dictionary" of thousands of labels. All of these labels can be accurately tracked, maintained and controlled. A single label can be used to provide private, secure communications to an entire organization or to any specified subset thereof.

The present invention is primarily directed to a label management system that is completely independent of any specific encoding algorithm, yet is useable with any of them. The present embodiment uses the Data Encryption Standard (DES), yet various specialized privacy algorithms can also be used transparently.

An important overall purpose of the present invention is to provide a cryptographic label key creation system that can minimize the sensitivity of encrypted messages by creating a unique transactional key which can be used by a cryptographic algorithm, such as DES, to scramble or encipher a plain text file. By using the present invention, both the sender and the receivers who use the transactional key know not only that it is unique to the message being sent, but also that the message could not even have been sent unless certain conditions had been met.

A preferred, working embodiment of the present invention is compatible with Microsoft Corporation's Windows operating environment. It also has automated rekey capability that provides it with a unique precise control of networks.

The present invention is directed to an integrated, computerized approach that has particular advantages over all other known key management systems. The present system utilizes unique access control techniques and data manipulation techniques to provide a maximization of security, yet has a simplified designed use that allows even the most unsophisticated person to use it. A plurality of variable length passphrases are used to modify other variables that may be embedded in the computer program or obtained from an outside source. In this way, each passphrase can be used to control one aspect of the communication environment. For example, in the present invention, seven aspects are controlled. These are the how, why, where, who to, who from, what and when. In the language of the application environment, they are the identification of the network over which the communicated transmission will or has taken place; the purpose of the communication; the place where the communication originated; the person, persons, groups or organizations to whom the communication is being or has been sent; the originator of the communication; the classification of the communication including the file name of the message; and the environment of the communication including the date stamp of the message.

To accomplish its purposes and objectives, the present invention utilizes one or more labels that are appended to a message. In the preferred embodiment, the labels are encrypted, concatenated and appended to a separately encrypted message. In this way, the labels can be stripped off and separately decrypted.

Access to both the sending and receiving of a communication is provided by a unique access control module in which a portable key disk is utilized to store unique initializing vectors that are used to generate a key.

These and other objectives, advantages, and features of the present invention will be expounded upon and set forth in, or apparent from, the accompanying detailed description of a presently preferred embodiment of the invention.

BRIEF DESCRIPTION OF THE DRAWINGS

FIGS. 7a through 7d are general block diagrams which depict the interrelationships between some of the subroutines of the computer program modules;

DETAILED DESCRIPTION OF THE PREFERRED EMBODIMENT

The present invention utilizes a computer program, and like many computer programs it involves a complex set of instructions, some of which, called subroutines, are repeatedly used at different times or are called at different locations within the program. In addition, as in many complex computer programs, the present computer program has a number of independent modules or subroutines which have a core of instructions that can be used in different environments with only the front end and/or the rear end of the subroutines being changed. However, the present description is that of a working embodiment of the present invention written in Visual Basic as it was developed for a specific application. As one skilled in that program would know, there are many features of Visual Basic which can be called from an applications program written in it. Also, as one skilled in the art would know, the computer program of the present invention could be written in other computer languages, such as C and C++. These features are not disclosed herein, but are incorporated herein by reference as that which would be known by one of ordinary skill in the art.

Other variations of the present invention are possible and some have been designed, but the embodiment of the invention described hereinbelow is believed to be the best mode because the code for it has been written.

I. Overview

Figure 1:
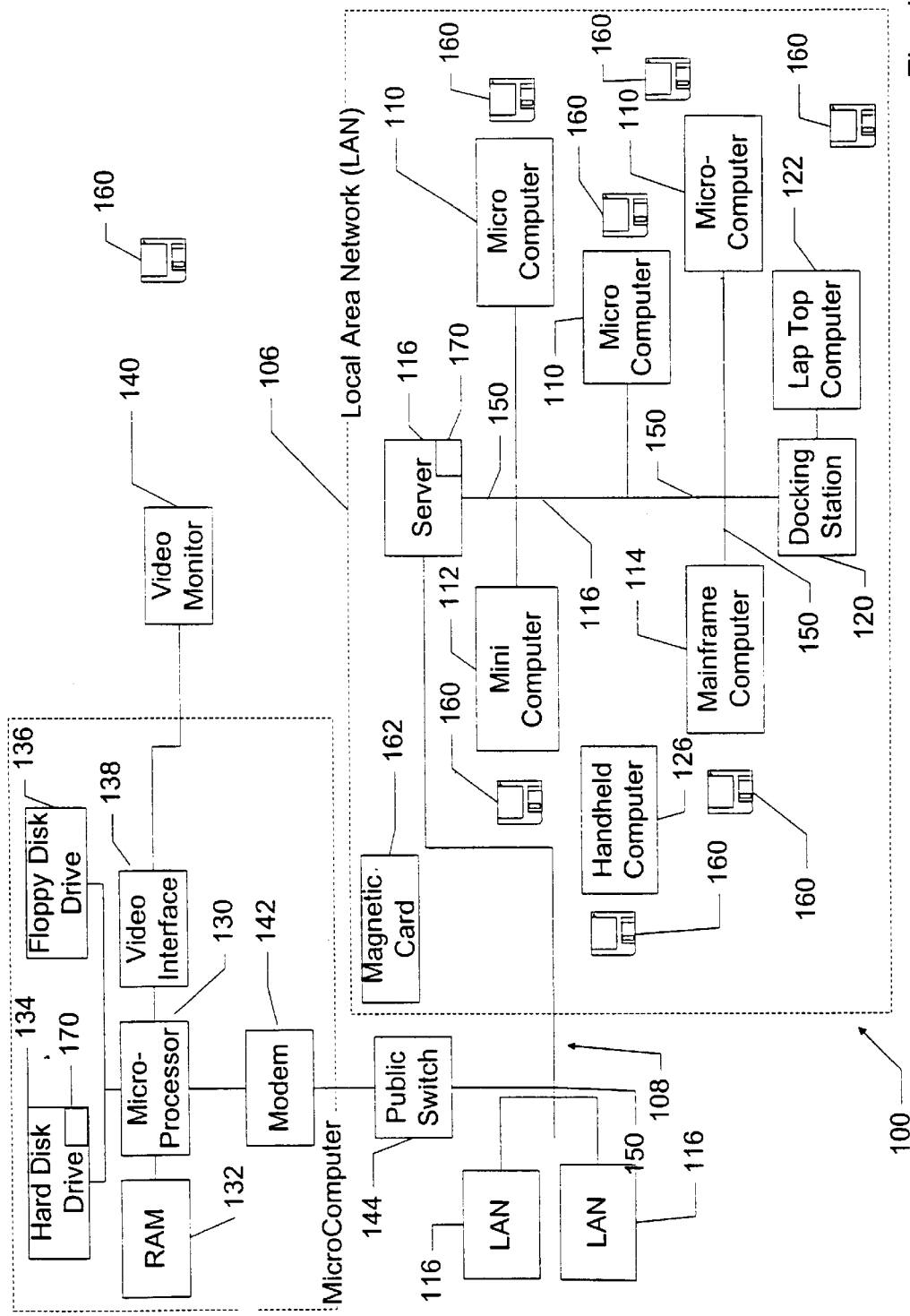
FIG. 1 is a schematic block diagram of a plurality of interconnectable computer systems.

With reference now to the figures in which like numerals represent like elements throughout the several views, an interconnected computer communication organization 100 is depicted in FIG. 1. Communication organization 100 is comprised of a plurality of Local Area Networks (or LAN) 106 interconnected by a telephone wide area network (or WAN) 108. Other links to computer communication organization 100 can include a satellite link (not shown) and a ground based microwave network (not shown).

An exemplary LAN 106 is comprised of a plurality of microcomputers 110 (sometimes called personal computers or PC's), an IBM AS/400 minicomputer 112 and a mainframe computer 114. Each local area network 106 is controlled by a server 116. Also connectable to LAN 106 is a docking station 120 into which a laptop computer 122 can be inserted, and a palmtop or hand-held computer 126, such as the type made by the Psion Company of England, which is shown connectable through minicomputer 112.

Microcomputer 110 typically is comprised of a microprocessor 130, a random access memory (or RAM) 132, a hard disk drive 134 and one or more floppy disk drives 136. In addition, computer 110 includes a video interface 138 connected between microprocessor 130 and a video monitor 140. For outside communications, microprocessor 130 is also connected to a modem 142, which in turn is connected through a public switch 144 to wide area network 118.

Figure 5A:
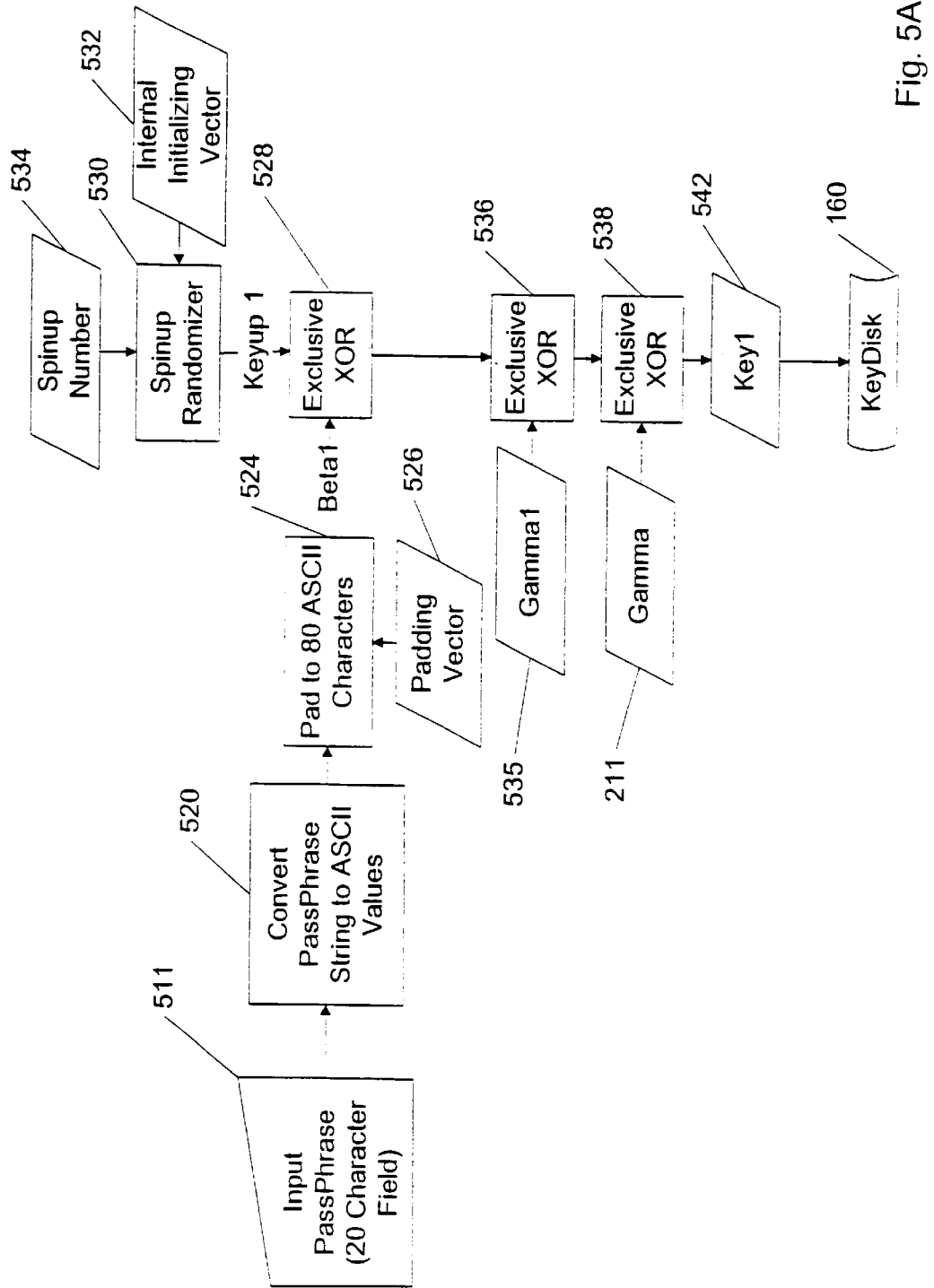
FIG. 5 is a general schematic flow chart of the subroutine used to generate a key disk.
Figure 5B:
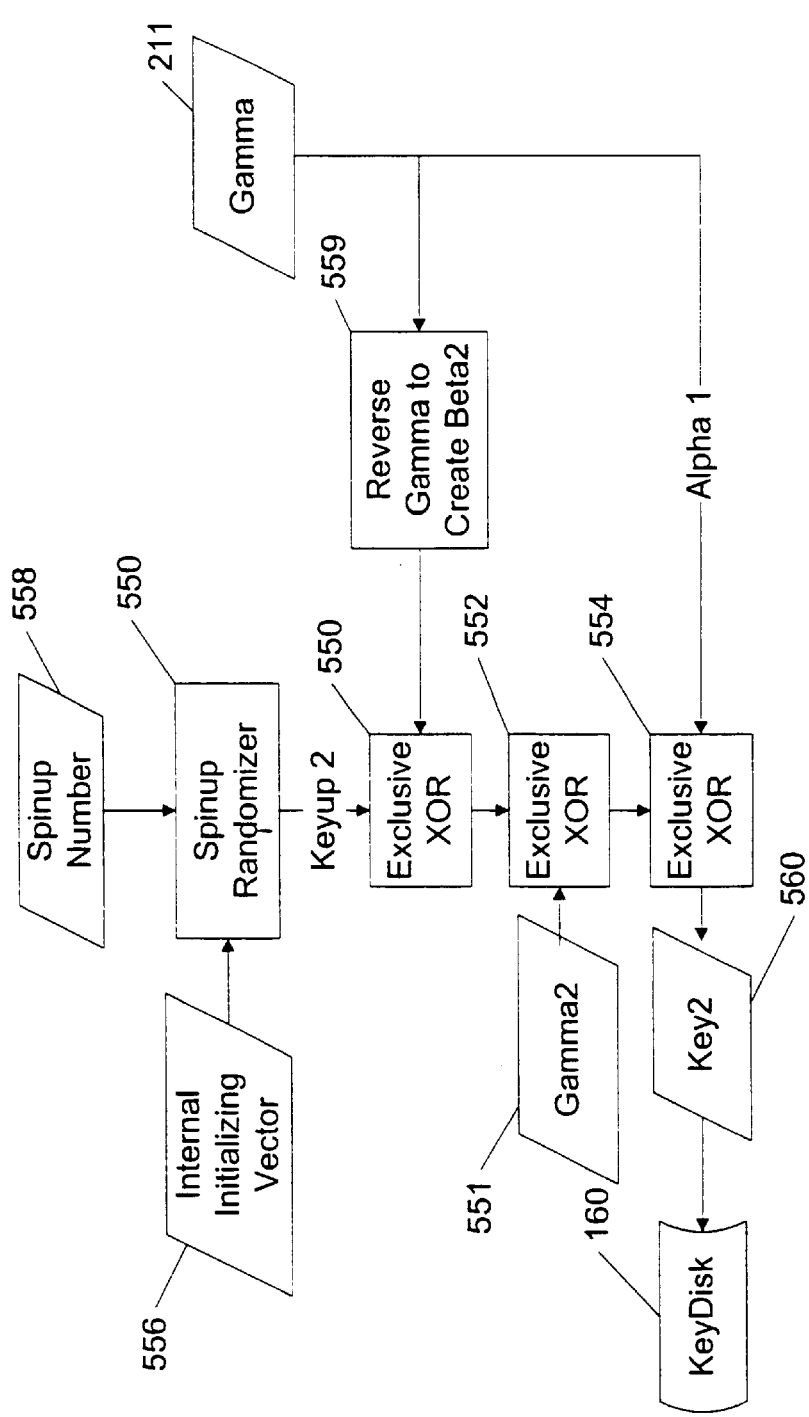

Communicating elements in computer organization 100 include a number of devices which can be removably or permanently connected to one another with communication links so that files or data can be passed from one to another or one can control another. The communication links can include a direct wire or fiber connection 150, an electromagnetic wave connection 152 (e.g. radio wave radiation, infrared radiation or light radiation), and a telephone wire connection 154. The communicating elements depicted in FIG. 1 are microcomputers 110, minicomputer 112, mainframe computer 114, laptop computer 122 and hand-held computer 126. Associated with each communicating element is a removable, portable memory storage medium, such as a floppy disk (FD) 160 or a magnetic card 162 that can be read by an associated memory drive, such as floppy disk drive 136. In organization 100 floppy disk 160 is usable in every communicating element except hand-held computer 126. Because of its small size, hand-held computer 126 can not use a floppy disk, but instead must use a different medium, such as magnetic card 162 that can be removably inserted therein. This portable storage medium is generically called herein a key disk and it contains two files currently having file names keyfile.kbt and chkfile.kbt. Each file is an encrypted randomized string that is 80 bytes or characters long and is produced in a Passphrase Keydisk Creation subroutine 500, depicted in FIG. 5 and described herein below.

Each memory storage medium of a communicating element contains certain critical files and data that are used by the computer program of the present invention. These include a file containing selected keys, a cryptographic algorithm, one or more spin-up numbers, and other data and information, described in greater detail hereinbelow. Each memory storage medium permits its associated communicating element to obtain the necessary keys and passwords as well as control numbers used in the controlling subroutines to manage and direct the operation of the present invention.

The communicating elements, memory storage elements, and communication links depicted in FIG. 1 are merely illustrative. Presently existing substitutes or substitutes developed in the future that are functionally or operational equivalent are also included in the definition.

The present invention includes a complex system computer program 170 that is comprised of a series of instructions. System program 170 is usually stored on the hard disk drive 134 of an individual microcomputer 110 or on network server 116 and is diagrammatically indicated there in FIG. 1. The instructions are arranged into a number of independent modules, independent routines, and called subroutines as well as dedicated sets of instructions. FIGS. 2 through 21 contain flow charts of the series of instructions or diagrams of data being used by the sets of instructions. It must be understood that each set of instructions is used by its associated computer at different times and in different combinations. For this reason, the present invention is believed to be best described by describing it as it operates and does a number of different functions, such as an encryption function or a decryption function.

Figure 2:
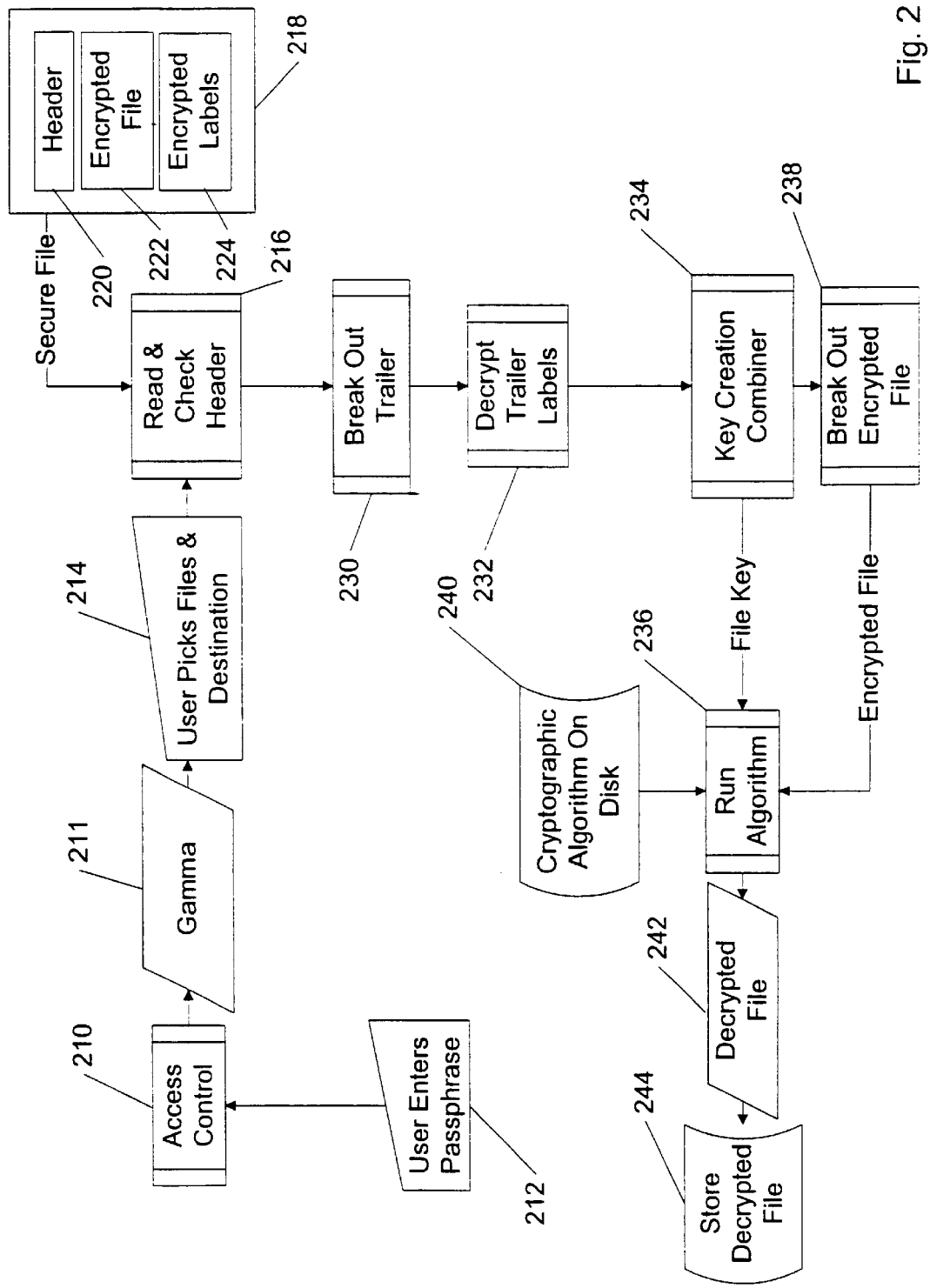
FIG. 2 is a very general schematic flow chart of the decryption process.

Turning now to FIG. 2 an overall block diagram of the decryption function of system computer program 170 of the present invention is depicted as being comprised of a number of modules or subroutines. These subroutines function together to take an encrypted input file and produce a plain text message if all of the labels and keys are correct. The encrypted message can be received by the computer over modem 142 or from local area network 116, or it could have been stored on either hard disk 134, a floppy disk 160 or a memory card 162.

Figure 8A:
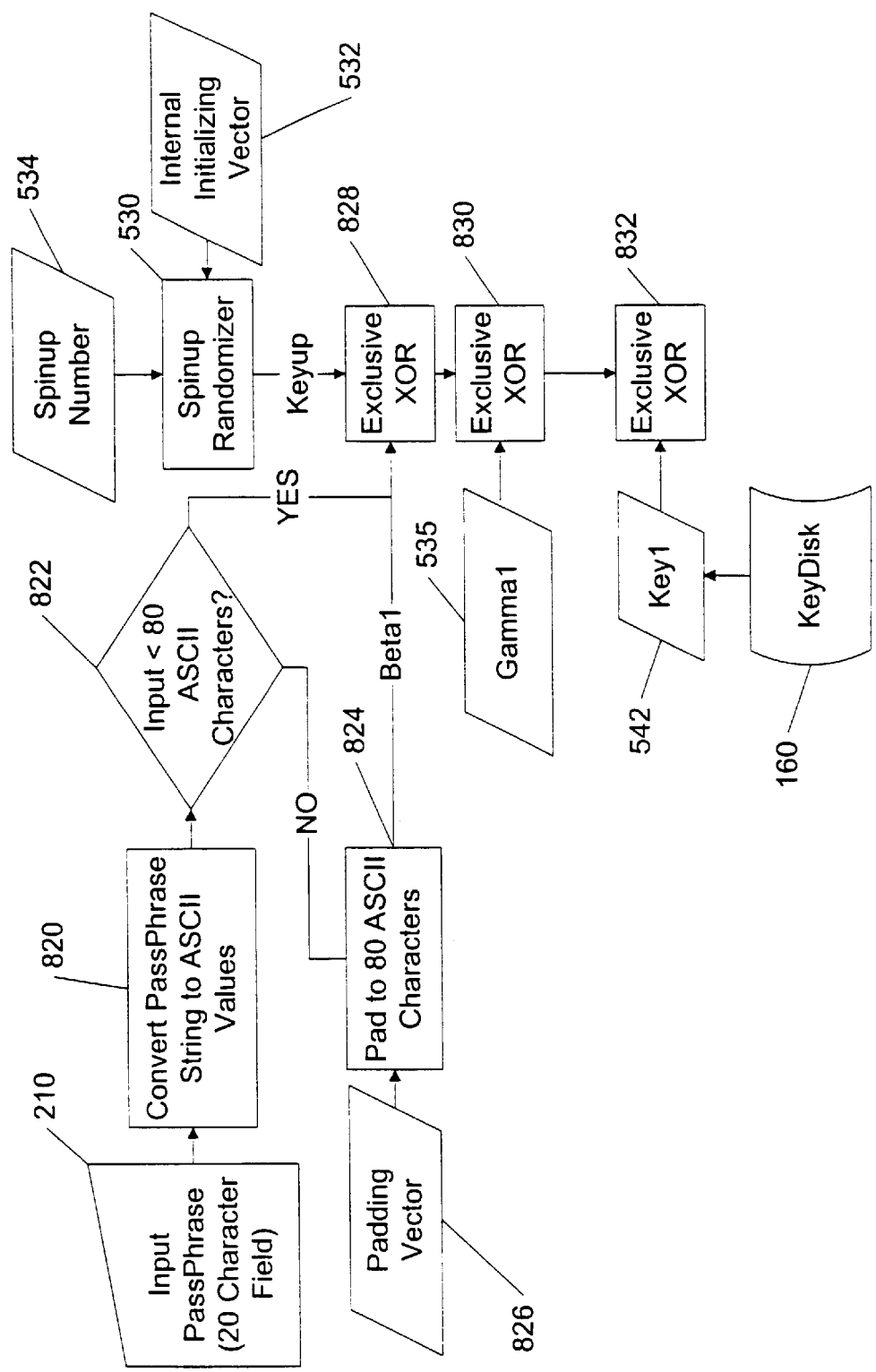
FIG. 8 is a more detailed schematic flow chart of an access control module or subroutine.
Figure 8B:
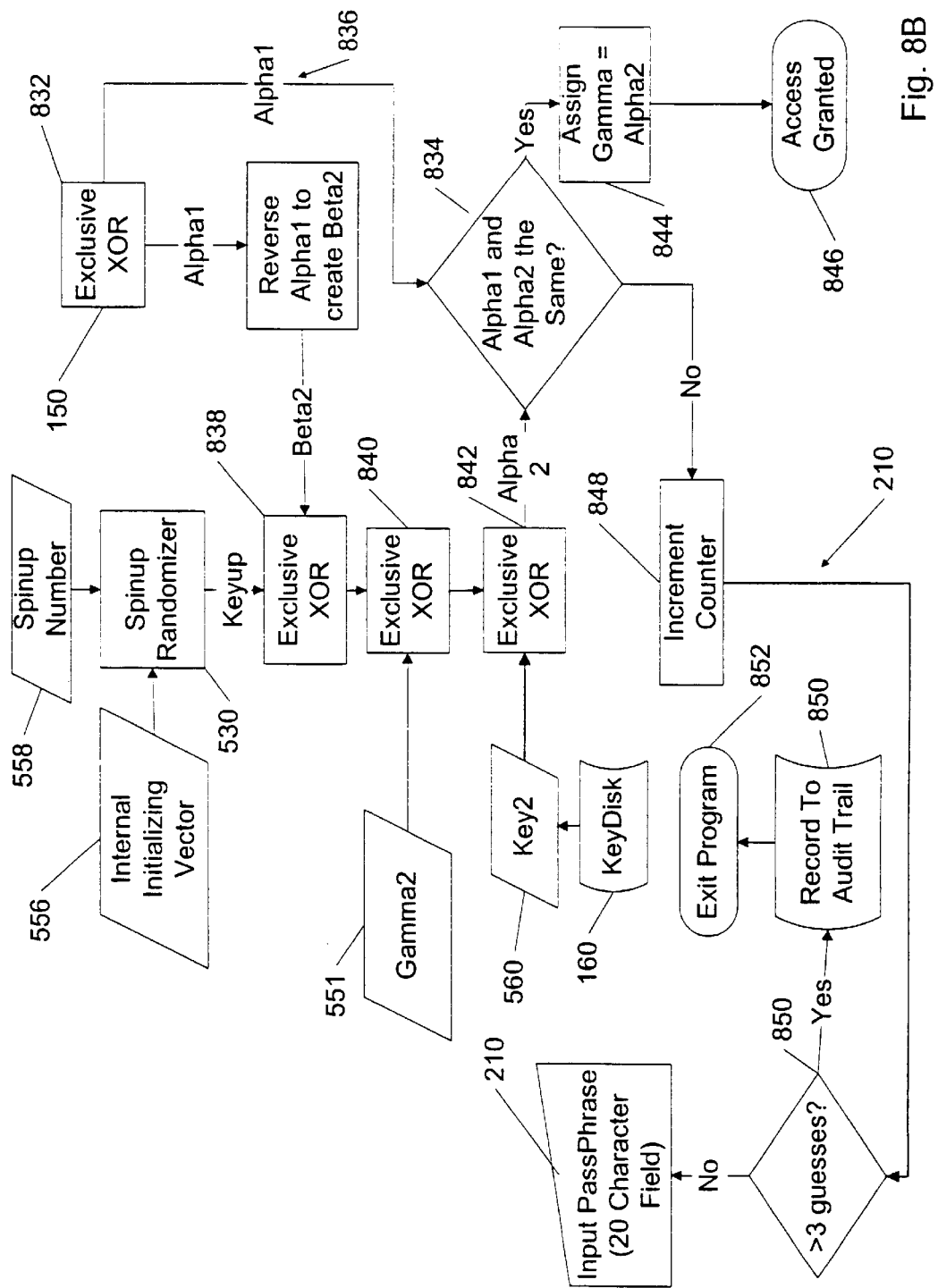

An Access Control module 210, described hereinbelow with respect to FIG. 8, is used to control access to system computer program 170 and is the first computer program element that is encountered by a user when system computer program 170 is called. A successfully run Access Control module 210 produces an 80 byte or character string that is called the Gamma key or vector and is denoted 211. As seen below, Gamma key 211 is used throughout the rest of the program.

A first input statement 212 then calls for the user to enter the user passphrase and a second input statement 214 calls for the user to pick the files to be decrypted and to enter the destination for the decrypted file. A subroutine 216 then gets the identified file to be decrypted, denoted 218, and puts it into computer RAM memory 132.

File 218 must be in a predefined format and protocol and consists of the following parts: a header 220, an encrypted file portion 222, and a trailer 224 that contains a plurality of encrypted labels. Reference is now made to FIGS. 3a and 3b where trailer 224 is depicted in greater detail.

It is the information that is stored in trailer 224 that provides the originator of file 218 the opportunity to add specific information about the file. In the present embodiment, trailer 224 has an exemplary division into the following seven portions and the information in each portion is called a label: the network portion 330 containing the Network label; the purpose portion 332 containing the Purpose label; the place portion 334 containing the Place label; the to portion 336 containing the To label; the from portion 338 containing the From label; the classification portion 340 containing the Classification label; and the environment portion 342 containing the Environment label. Each unencrypted trailer portion has a predefined length of 20 characters and the label in each can have up to 20 characters. However, if the label does not contain 20 characters, then, as described hereinbelow, the computer program packs the label, as shown in FIG. 3c, with a random character, which in the present embodiment is all the same character and is the letter "X." The encryption process increases each label to 80 characters producing a total of 560 characters or bytes actually carried as an encrypted label for each encrypted file. Because the standard bit length of each character in the conventional computer software is eight, each trailer has a total of 4480 bits.

In the present embodiment of the protocol for trailer 224, certain parts of certain trailer portions have certain character locations reserved to indicate a particular type of information. For example, as shown in FIG. 3b, classification portion 340 has been broken down into 4 parts: a plain text filename part 352 having 11 locations in length; a reserved part 354 having one location in length that is filled by the computer program with a random character, which in FIG. 3b is an "X;" a classification code part 356 having two locations in length, which in the present example is "SG" for "secret" classification and for General Use; and a data code part 358 having six locations, which for example can contain an Organizational Drop Dead data code date, such as "101595," (Oct. 15, 1995). As another example of subdivisions within a trailer portion, reference is made to environment portion 342 in FIG. 3b in which it is also broken down into four parts: an encrypted date part 370, which in the present example is Oct. 10, 1994; an encrypted time part 372, which in the present example is 9 AM and 15 seconds; an encrypting algorithm code part 374, which in the present example is "D" which represents the DES encrypting algorithm; and a unique digital file signature part 376, which in the present example is "89A3114."

Returning now to FIG. 2, subroutine 216 also reads and checks header 220. Header 220 is a fixed length message header that can contain plain text information and a marker. If used, a marker designates the beginning of a file so that should a plurality of files be concatenated, the ending of a previous file can always be determined.

After reading the header and trailer, the program proceeds to a subroutine 230 which cuts or breaks out trailer 224 by going to the end of the file and then selecting the last 560 bytes. The header is then transferred to a separate storage location in the computer RAM memory 132. The next set of instructions, subroutine 232, then decrypts the trailer labels and provides the information to a subroutine 234.

System program 170 then enters a subroutine 234 that creates a key combiner that is necessary as an input to the encryption algorithm in order to properly decrypt file 218, and it sends a created file key to a run subroutine 236 and sends the entire file 234 to a second break-out subroutine 238. Subroutine 238 uses the information of the fixed length of header 220, the location of the fixed length trailer 224 in file 218, and a mask to break-out or strip-out the encrypted file 222. In this way, encrypted file 222 can have any length and thus file 218 can have any length. All that is required is that header 220 contains a unique string of characters so that the beginning of file 218 can be determined.

Subroutine 236 uses the information in part 374 of environment portion 342 of header 220 to determine which cryptographic algorithm was used to encrypt file 218, and retrieves that algorithm from its storage location 240 on a storage disk, which storage disk could be hard disk 134, or less preferably floppy disk 160. In this embodiment, the conventional DES algorithm was used, but any cryptographic algorithm could be used. After subroutine 236 runs the cryptographic algorithm, a decrypted file 242 is created and stored in a storage location 244 on some storage medium, such as hard disk 134, or just temporarily in computer RAM memory 132.

Figure 3:
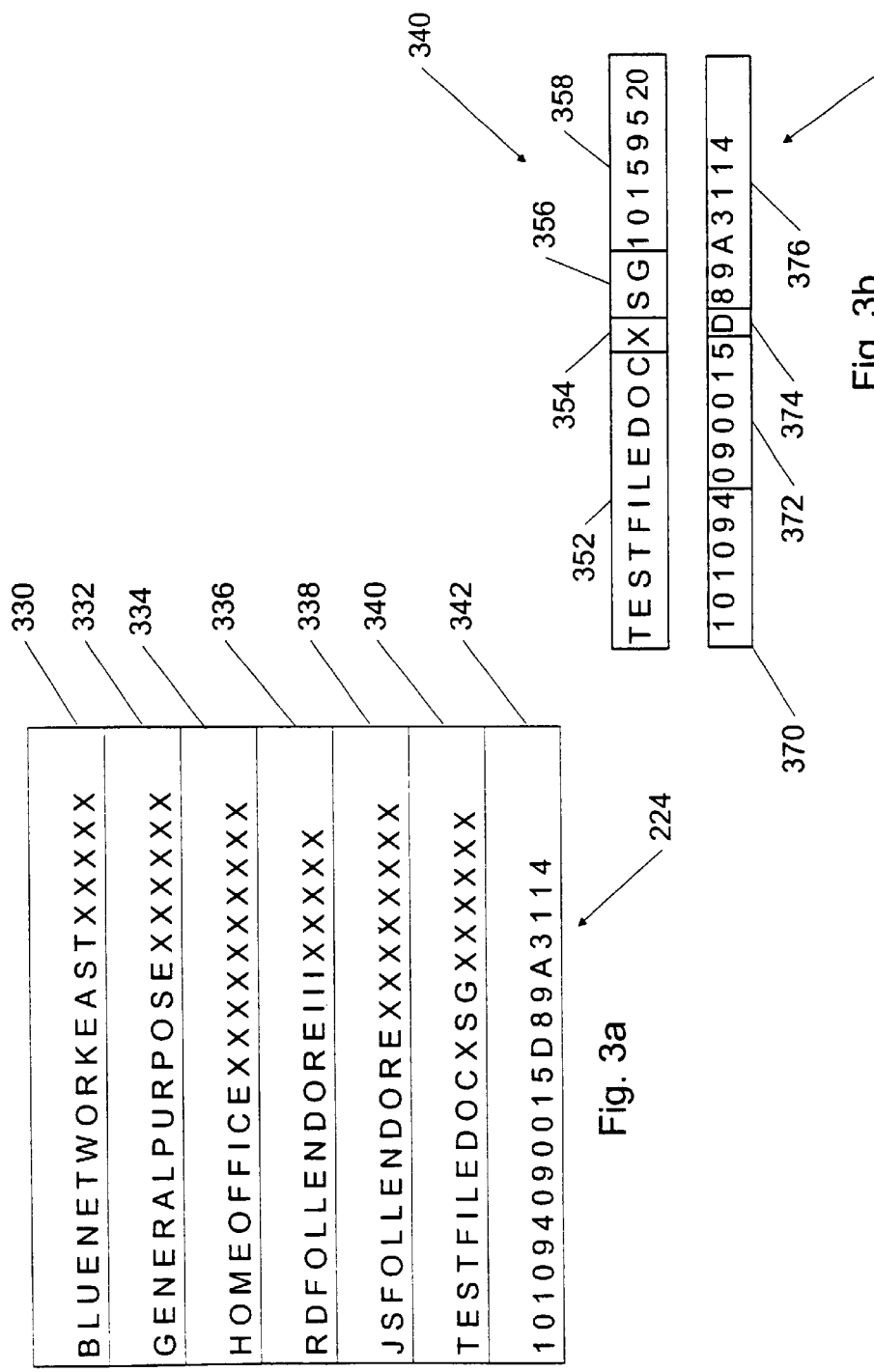
FIGS. 3a and 3b are a chart of the structure and substructure of the trailer of a message assembled with the present invention.
Figure 4:
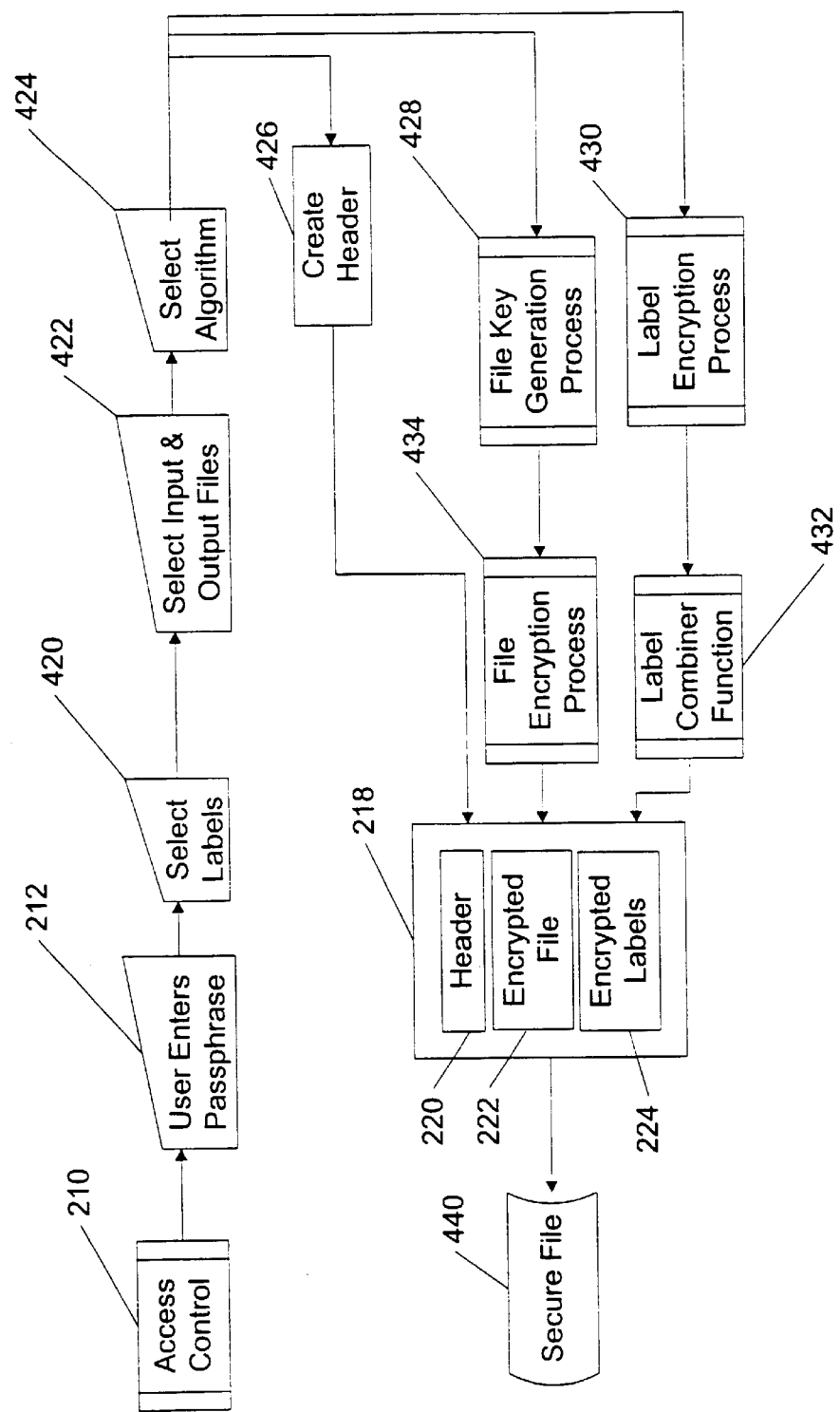
FIG. 4 is a general schematic flow chart of the encryption process.

The encryption process is essentially the reverse of the decryption process and the subroutines used to accomplish it are depicted in general in FIG. 4. Access Control module 210 is used to control access to the rest of system computer program 170 in conjunction with a user passphrase, called for by first input set of statements 212. Once system program 170 has been opened, it provides a set of instructions 420 to assist the user in selecting the desired ones of the labels (see FIG. 3a) to be used and the label information to be used in a particular label. Exemplary labels are depicted in FIG. 3a and a subroutine for selecting the label is described below with respect to FIG. 9.

Two further sets of instructions, 422 and 424, call for the selection by the user of the input file to be encrypted, the name of the output file name and the algorithm to be used for the encryption. This information is used to build part of classification portion 340 and environment portion 342 of trailer 224. Subroutine 426 then uses the entered input information from instruction sets 212, 420, 422 and 424 to build an unencrypted header 220. Some of the same information is used by a subroutine 428 to generate the requisite file key, discussed hereinbelow with respect to FIG. 7d.

A subroutine 430 then encrypts the label to create an encrypted label 224. Label 224 is received by a subroutine 432 which combines all of the label information that has been entered by the user and encrypted. The file key generated by subroutine 428 is used by a subroutine 434 to encrypt the selected file 422 in a conventional way to produce an encrypted file 222. When concatenated with header 220 and encrypted label 224 as a trailer, a secure file 218 is produced. File 218 is then stored in a storage medium, such as a hard disk 440, as a secure file. Alternatively or in addition, file 218 could be transmitted to another computer as mentioned above with respect to FIG. 1.

II. Key disk

An example of a portable storage medium usable with the present invention has been described above as including floppy disk 160. For the purposes of describing the present invention, the portable storage medium will be referred to as floppy disk or key disk 160, but no limitation on the type of usable portable storage medium that is intended. Key disk 160 contains vital information without which the decrypting station could not decrypt an encrypted message. System computer program 170 includes a Passphrase Keydisk Creation subroutine 500, depicted in FIG. 5, to generate and store the information on key disk 160.

The user's passphrase, entered by the user in input statement 511, is sent to a set of instructions which convert the individual alphanumeric elements of the passphrase to a string of two number ASCII values using conventional well known techniques. The converted passphrase is then padded to 80 ASCII characters in process box 524 utilizing a padding vector 526 to pad the entered passphrase and thereby to generate a key called Beta1. Beta1 is then received by a set of instructions in process box 528 which perform an EXCLUSIVE OR operation on Beta1 with a generated string called keyup1.

As is well known, the EXCLUSIVE OR (often called XOR) process is extensively used in the cryptographic computer field to reversibly generate a scrambled output. The EXCLUSIVE OR process compares every bit of one input word with a correspondingly located bit of a second input word and produces an output of a "1" if and only if one of the input bits is a "1" and the other input bit is a "0". Otherwise the output from the comparison is a "0".

The Keyup1 string, the other input to XOR subroutine 528 is the output from a Spinup Randomizer subroutine 530 depicted in greater detail in and discussed hereinbelow in connection with FIG. 6. For the present time, however, it is sufficient to state that Spinup Randomizer subroutine 530 produces a new 80 character randomized alphanumeric string from an internal initializing vector 532 that has undergone a number of cycles in subroutine 530 determined by a spinup number 534.

The output from XOR subroutine 528 is sent to a second XOR subroutine 536 which produces an exclusive ORing with a vector located in data box 535 and denoted Gamma1. Gamma1 in the present embodiment is a vector that is stored in system computer program 170. However, Gamma1 could be unique to a communication network, such as LAN 116, and thus limit access to an encrypted file using this key to a particular LAN, for example. The output from XOR subroutine 536 is sent to a third XOR subroutine 538 which produces an XORing with Gamma Vector 211 generated by Access Control subroutine 210. The output from subroutine 538 is denoted Key1, as depicted in data output box 542, and is stored on key disk 160.

Gamma vector 211 is also the input to the last XOR subroutine 554 of three XOR subroutines 550, 552 and 554. One of the two inputs to subroutine 550 is from Spinup Randomizer subroutine 530 which produces its output, denoted Keyup2, based on a second internal initializing vector 556 and a second spinup number 558. The other input to subroutine 550 is the reverse of Gamma vector 211, which is denoted Beta2 and produced by a set of instructions in process box 559. The output from subroutine 550 is XORed with a vector Gamma2 551 in XOR subroutine 552, and the output of subroutine 552 is XORed with the Gamma vector 211. The output of XOR subroutine 554 is denoted Key2 in a data box 560 and is stored on key disk 160.

Figure 6:
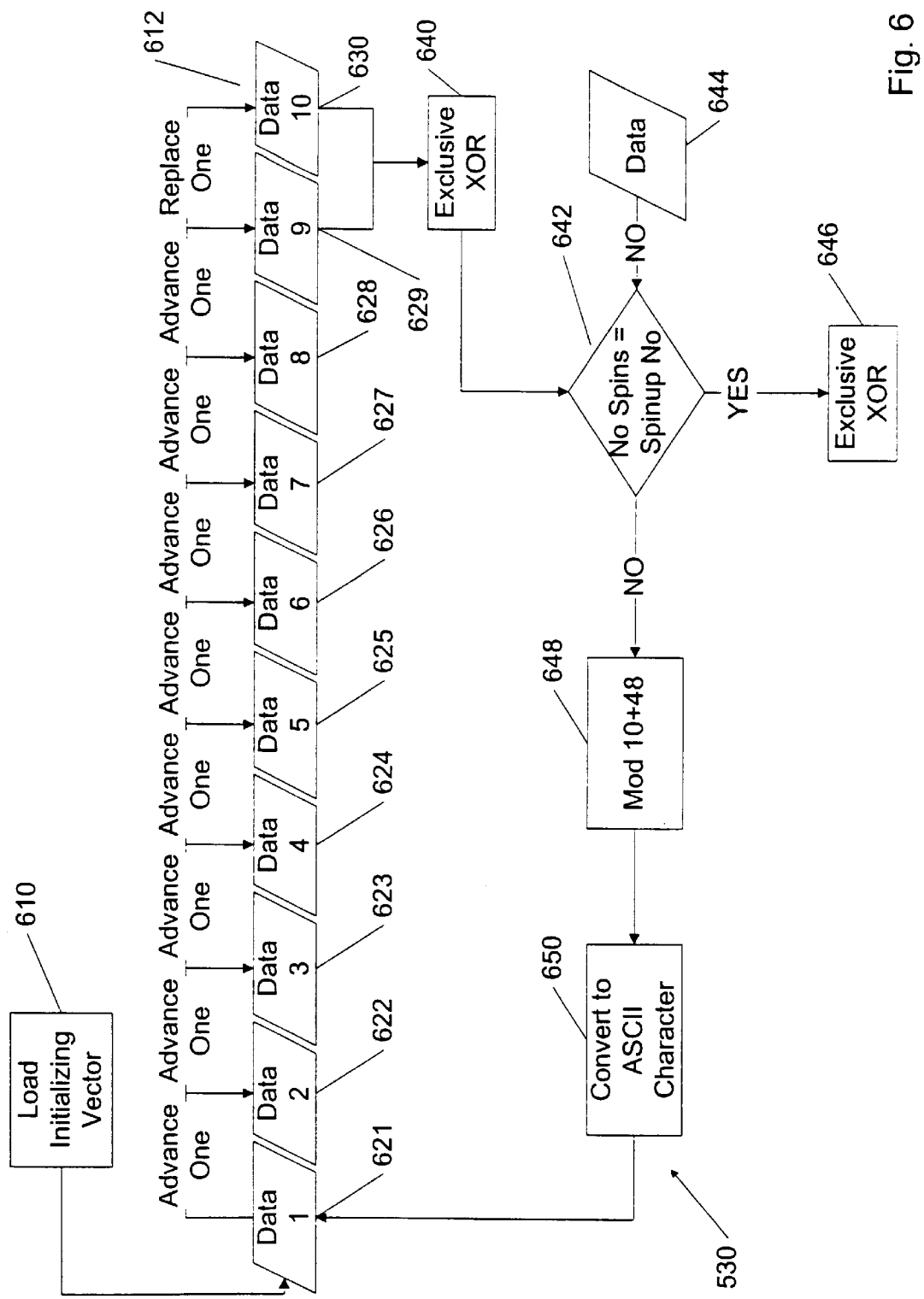
FIG. 6 is a schematic block diagram of a subroutine used for encrypting an initializing vector or for generating a random number.

Spinup Randomizer subroutine 530 is now described with respect to FIG. 6. An exemplary ten byte, stored initializing vector, which in the present embodiment is contained in system computer program 170 but could be a called string, is loaded by the instruction set defined by program box 610 into a subroutine 612 that emulates a shift register. Each character or byte of the initializing vector is initially loaded in parallel and stored into its own storage box 621 through 630. The outputs of the last storage boxes 629 and 630 are used as inputs into an XOR subroutine 640. Each storage box then shifts its character contents one box to the right as seen in FIG. 6, replacing the character in that box. Subroutine 640 XORs each corresponding bit of the two characters located in storage boxes 629 and 630 together and provides the output as an input to first storage box 621 of shift register subroutine 612. A decision diamond 642 compares the number of cycles, spins or shifts with a spinup number 644 and when the numbers are equal, the spinup is complete and an output initializing vector is provided at exit box 646.

The string that results represents a reproducible, but not reversible, randomization of the original string. The unique initializing vector can be embedded in system computer program 170, can be generated as a unique alphanumeric string, or can be stored in the system, on key disk 160, or provided from some other source outside of the particular computer (e.g. with a received file). This is also true of the spinup number, except that the spinup number in the presently preferred embodiment is a single digit integer in order to minimize the time spent by Spinup Randomizer subroutine 530. In addition, the system computer program 170 utilizes a spinup subroutine in several locations and the subroutine can be the same one called every time or can be similar with some relatively minor differences (e.g. see the discussion regarding Spinup Random Characters subroutine 1732). Also, the initializing vector can be the same for all uses, used only with some of them or completely different for each use. Similarly the spinup number can be the same, or one or more of them can be unique to the particular use. It is noted that although the length of the string of data boxes in FIG. 6 (i.e. the number of boxes) is depicted as ten, the length can really be any integer greater than one. While the larger the number of boxes means a more secure system, it also means that it will take longer to run the subroutine.

Also, although the spinup number has been described as being a single digit integer, it can also be a multiple digit integer. Knowing the exact value of either the initializing vector or the spinup number is not important. What is important is that if the same spinup number and initializing vector are used, then the same result will appear at exit box 646.

Returning to decision diamond 642, if the number of spins does not equal the spinup number, then the program proceeds to process box 648 where a modulo 10 operation is performed on the value of the digits provided by XOR subroutine 640. The number 48 is then added to the modulo result so that the resulting number will always be a two digit number. The output of modulo process box 648 is then entered into process box 650 where each digit is converted to its ASCII equivalent.

For example, if the results in stages 9 and 10 are 28 and 4, respectively, their binary equivalents are: 0001 1100 and 0000 0100 respectively. The results from XOR subroutine 640 are:

$$\begin{array}{r} 0001\ 1100 \\ 0000\ 0100 \\ \hline 0001\ 1000, \end{array}$$

or the decimal number 24. The ASCII equivalent of 2 is 50 and the ASCII equivalent of 4 is 52 and that is the number that is stored in stage 621.

III. More Detailed Description

A more detailed explanation of the computer program modules and subroutines of the present invention will now be presented with initial reference to FIGS. 7a through 7f which depict the association between the modules and subroutines.

FIG. 7a depicts the association of components for Access Control module 210. When system computer program 170 is first entered, the authorization of the user is initially checked to insure that the user is authorized to use the system in Access Control Module 710 depicted in FIG. 8. The user inputs a passphrase in input box 712 which is checked in module 710. During part of the check, a random number is generated by Spinup Randomizer subroutine 530, described hereinabove with respect to FIG. 6. If the passphrase is valid, the user is given access to the rest of system computer program 170 and as mentioned above, a pass key called the Gamma vector is produced at data output box 211.

Figure 14:
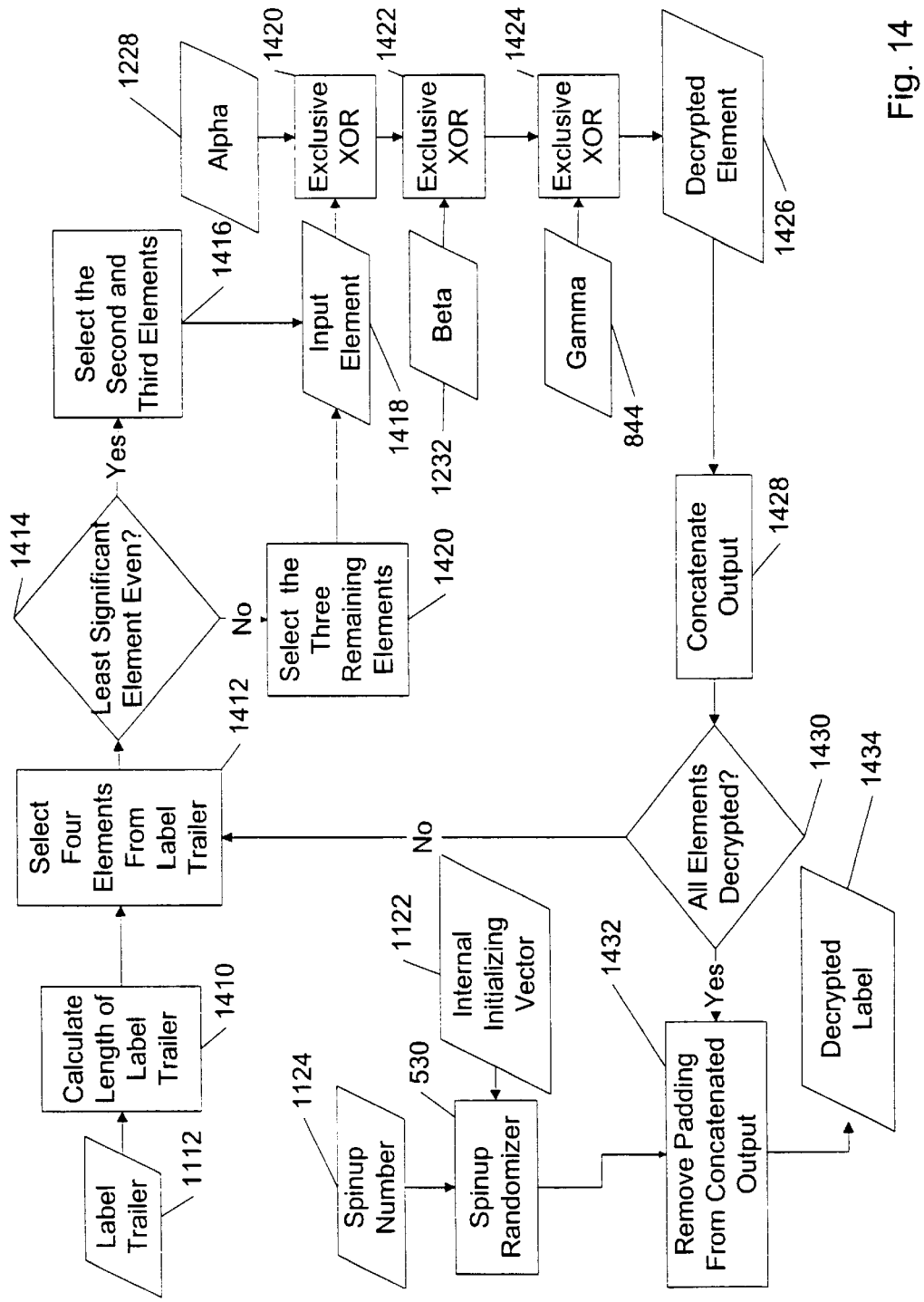
FIG. 14 is a detailed schematic flow chart of the module that decrypts the trailer of a message.

FIG. 7b depicts the association of components for the Label Element Decryption module 720 depicted in FIG. 14. The stripped off trailer of an incoming message or file is provided as data at data input box 722. A random number is generated by Spinup Randomizer subroutine 530 and used in the decryption process of module 720 to produce a decrypted label at data output box 726.

Figure 12:
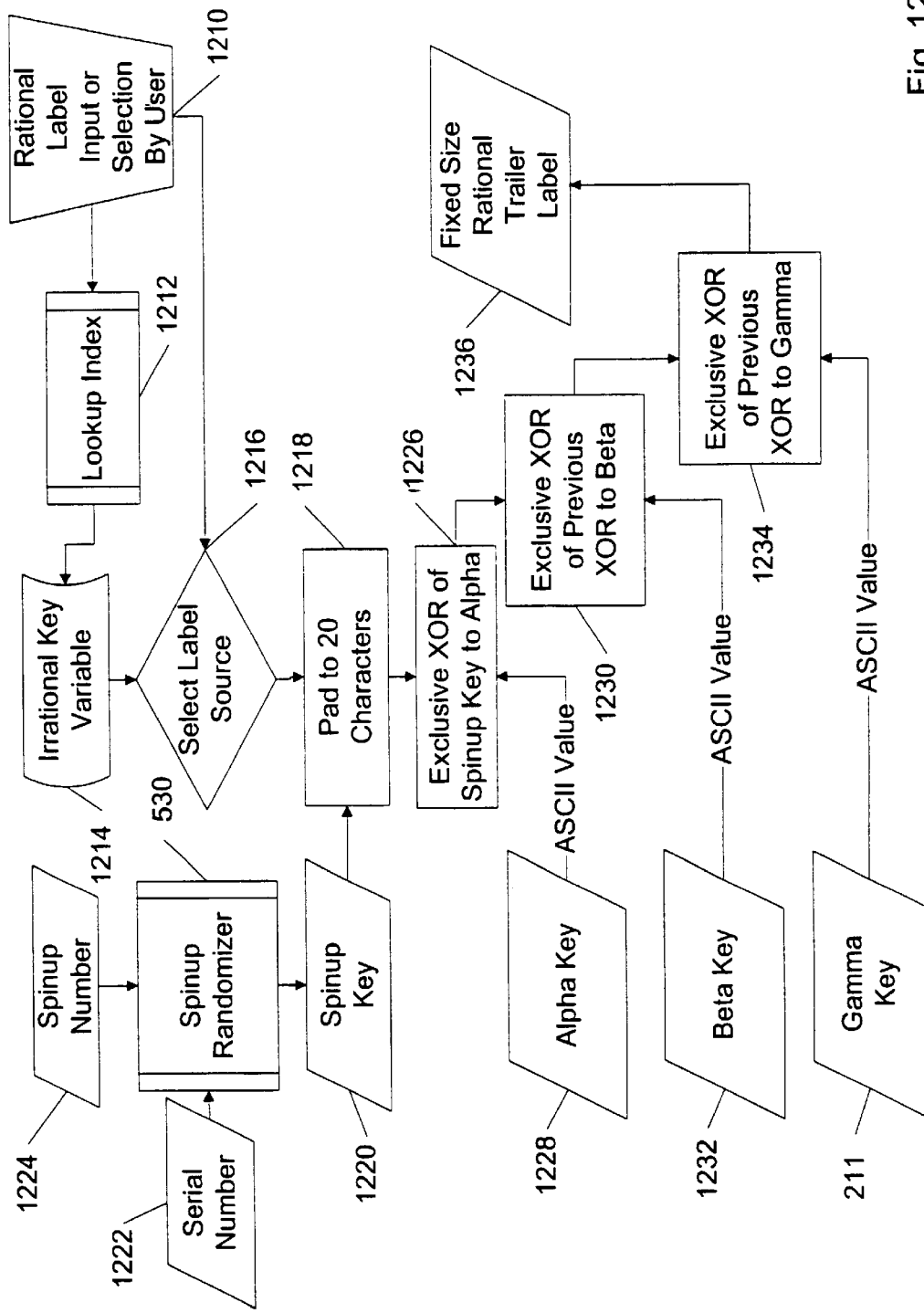
FIG. 12 is a more detailed schematic flow chart of the label encryption module.

FIG. 7c. depicts the association of components for the Label Element Encryption module or subroutine 730 depicted in FIG. 12. A serial number representative of the network or some other initializing vector, and the Alpha, Beta and Gamma keys are provided as input data in data input box 732. These numbers or vectors and keys are described herein below. A random number is generated by Spinup Randomizer subroutine 530 and an optional label look up process is provided by subroutine 734. Label Decryption module 730 produces a fixed size rational trailer label at data output box 736.

Figure 7D:
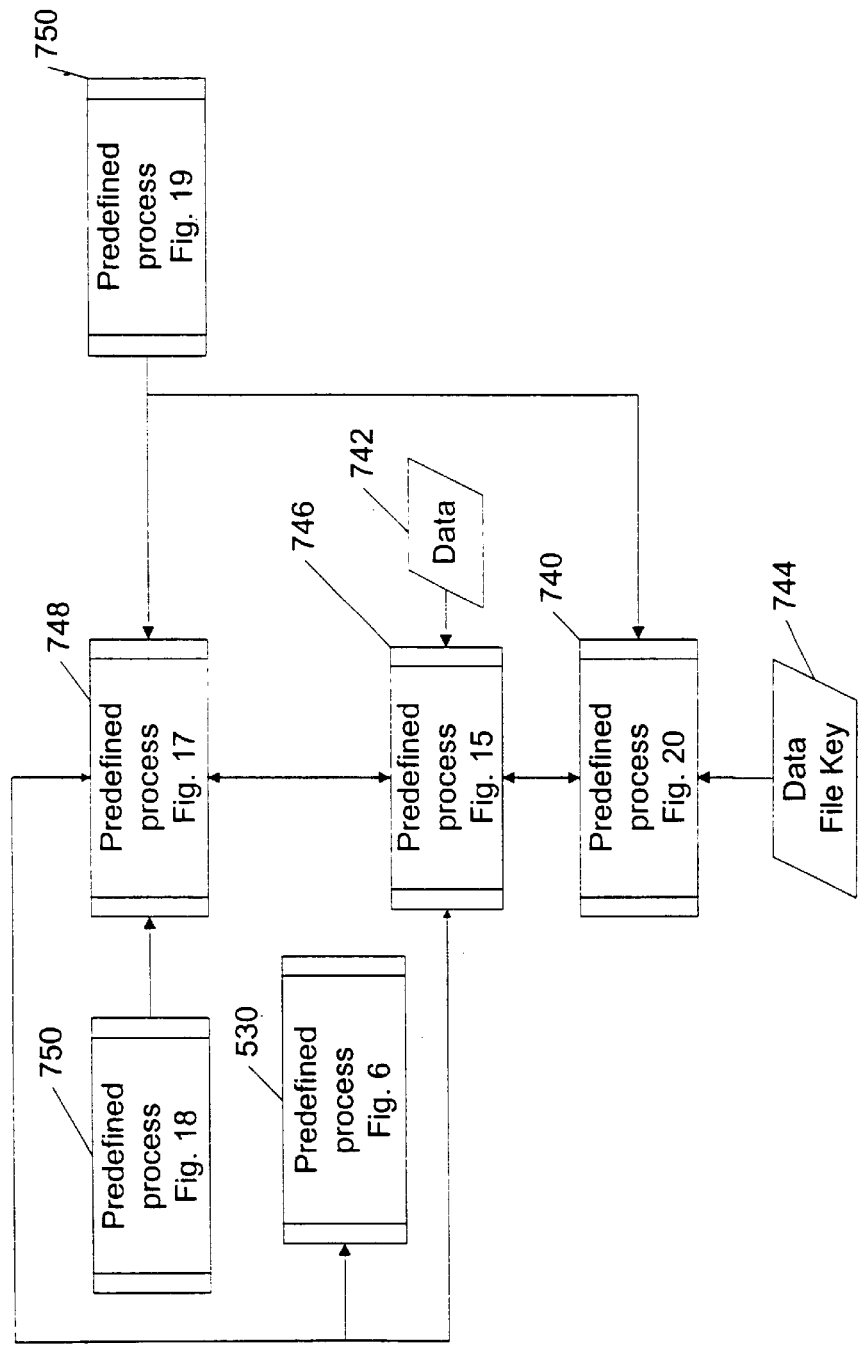
Figure 18:
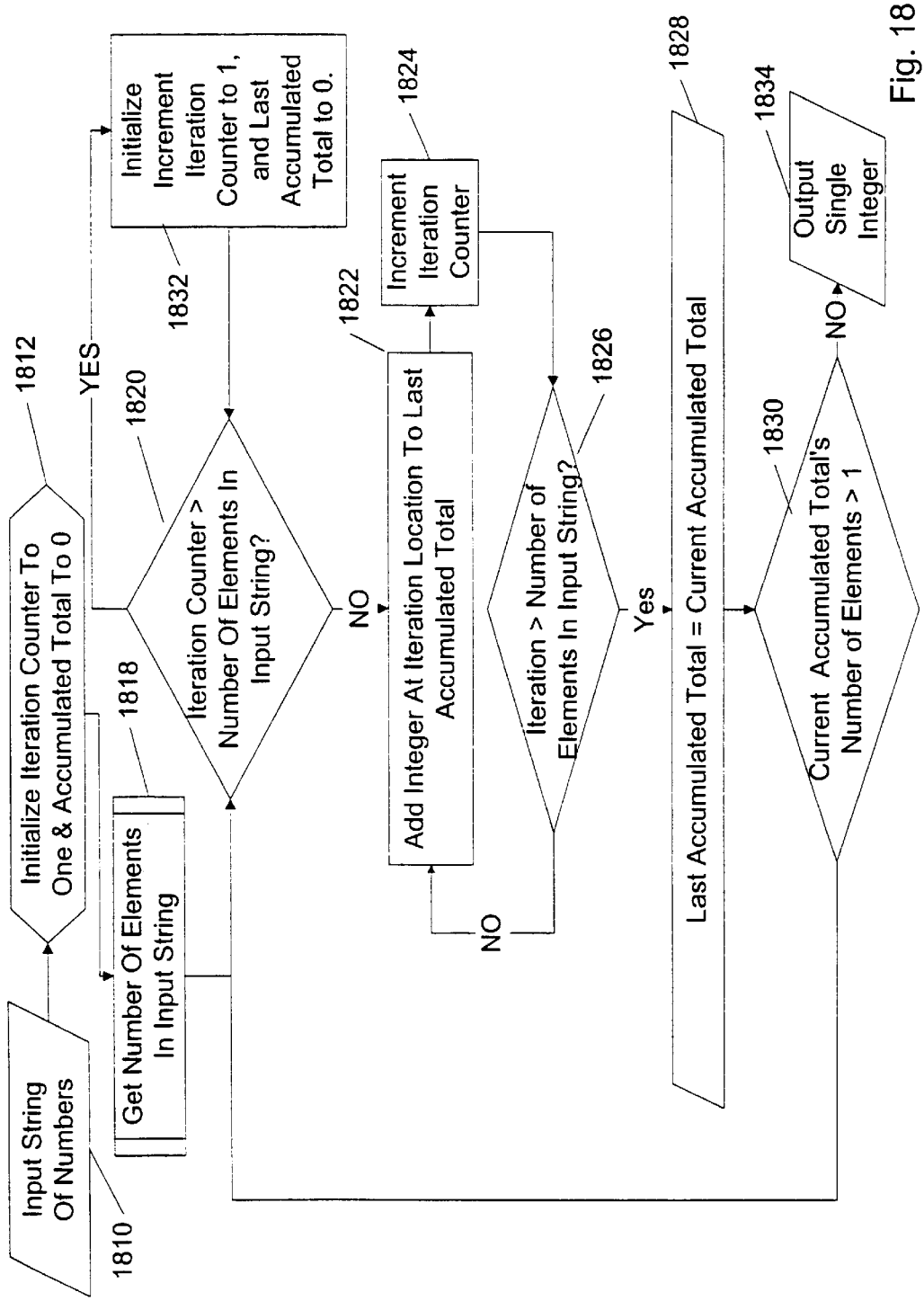
FIG. 18 is a schematic flow chart of a subroutine used in FIG. 16 to reduce in a reproducible way the number of digits in an alphanumeric string to one integer.
Figure 19:
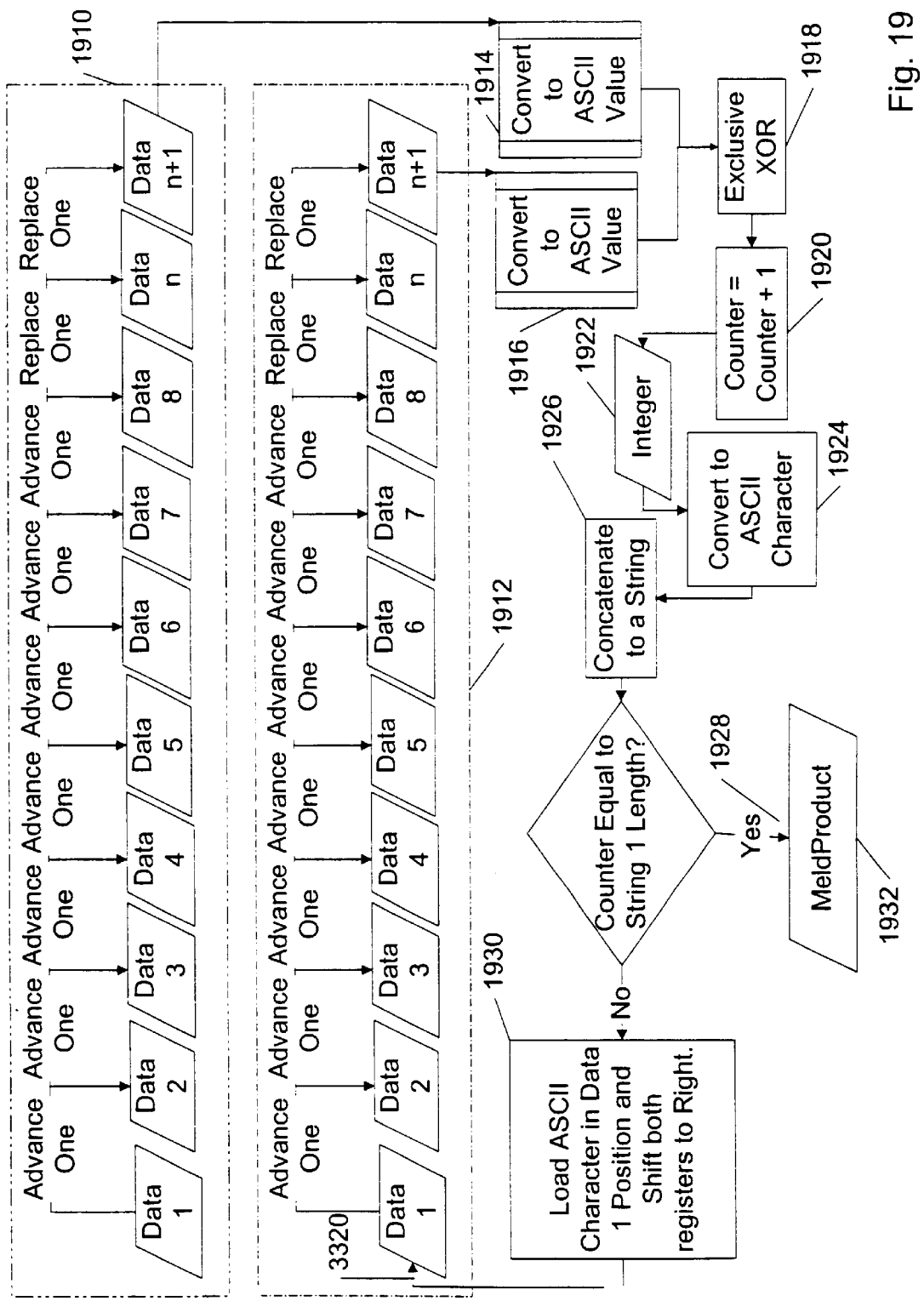
FIG. 19 is a schematic flow chart of a subroutine used to reproducibly meld together two equal or unequal length strings and is used in FIG. 17.
Figure 20:
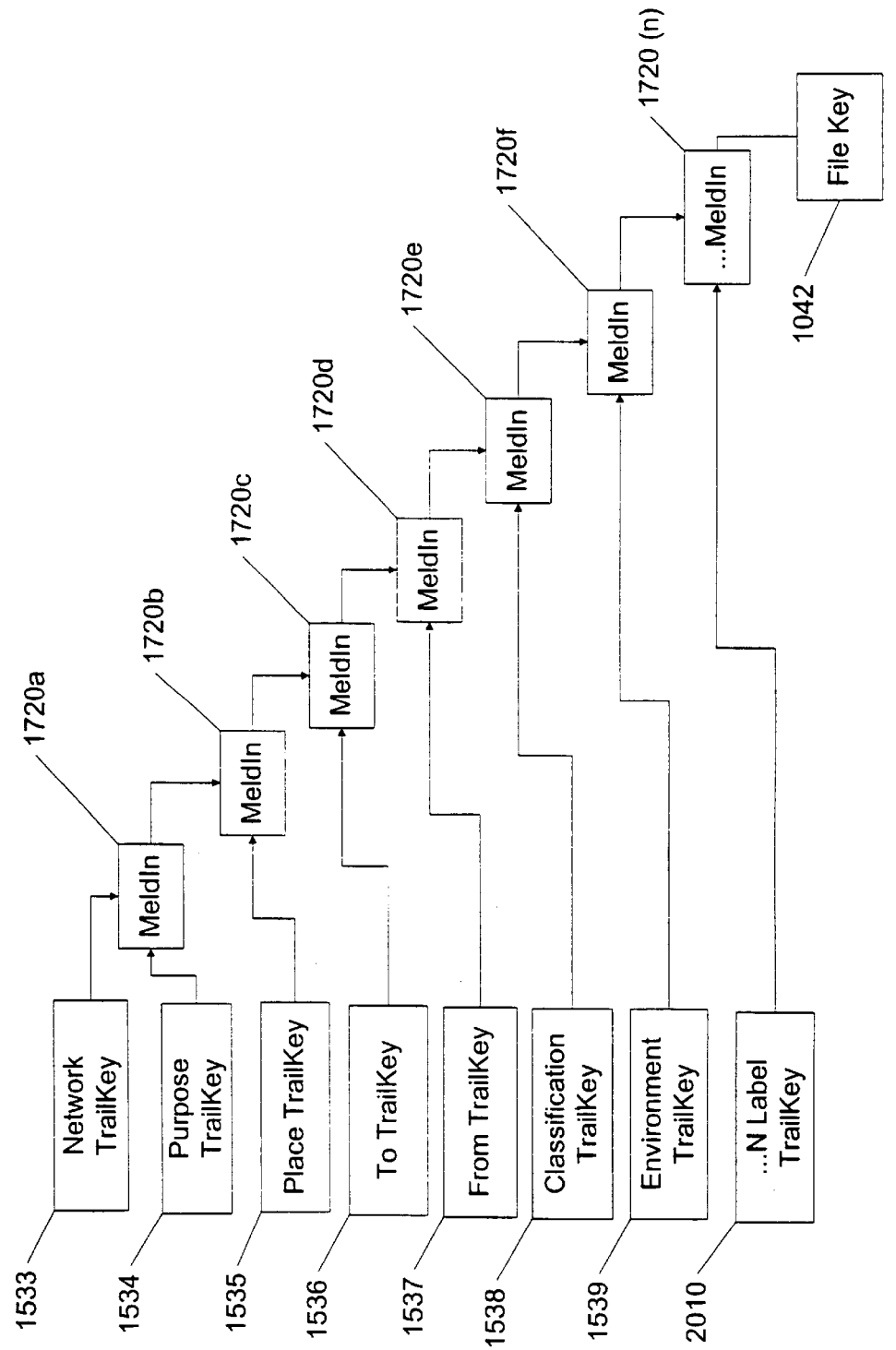
FIG. 20 is a schematic flow chart of a subroutine used to reproducibly combine the trailkeys generated in FIG. 16 to produce a single file key that is used as a vector in the encryption algorithm.
Figure 21:
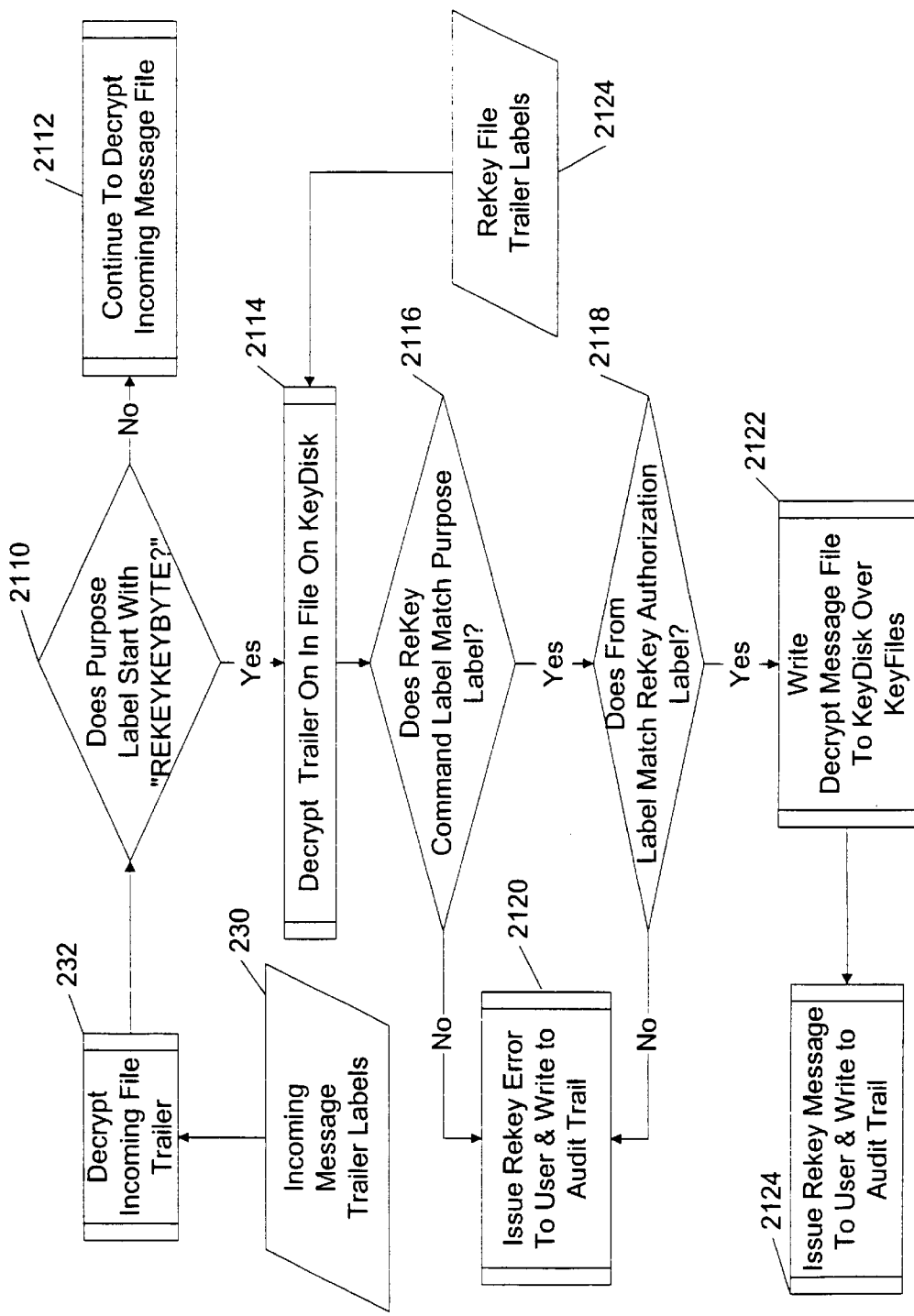
FIG. 21 is a schematic flow chart of a subroutine used to automatically rekey the recipient of a message.

FIG. 7d depicts the association of components depicted in FIGS. 16 through 19 for the File Key Production Module 740 depicted in FIG. 20. Module 740 receives the labels that are used in trailer 224 as inputs at data input box 742 and produces a key (sometimes called a vector) at data output box 744 that initializes the file encryption algorithm as described above in the description of FIG. 4. The labels are provided to a Label Key Generation Subroutine 746 that is used to produce related trailkeys. A Meld Key module 746 receives a random number generated by Spinup Randomizer subroutine 530, a spin-up number compacted from several keys in a subroutine 748 and uses a subroutine 750 to combine the various strings to encrypt a label which it provides to File Key Production module 740. Subroutine 746 produces a plurality of trailkeys, one per label, and provides them to module 740.

Referring now to FIG. 8, Access Control module or subroutine 210 will now be described. As mentioned above, Access Control module 210 is used to control access to the rest of system computer program 170 and is the first computer program element that is encountered by a user when system computer program 170 is called. Access control module 210 is quite similar to Key Disk Creation module 500 described above with respect to FIG. 5.

Input statement 210 receives and checks the user's passphrase to ensure that it is both valid and has the requisite 20 byte length. Instructions in process box 820 convert the passphrase string to ASCII values as described hereinabove. Instructions represented by decision diamond 822 check the length of the ASCII string and if the string is less than 80 characters or bytes long, the program branches to instructions represented by process box 824 which uses a padding vector 826 to create an 80 ASCII character string which is called Betal. In the presently preferred embodiment, padding vector 826 is embedded in system program 160, but it need not be and as stated before, can for example be supplied to system program or generated. If the converted passphrase string is equal to 80 characters in length, the program identifies it as Betal and provides it as an input to the first of three concatenated XOR subroutines (XOR) represented by process boxes 828, 830 and 832. The other input to XOR subroutine 828 is a string called "keyup1." Keyup1 is a random number produced by Spinup Randomizer subroutine 530, described hereinabove with respect to FIG. 5, that uses the same initial input or internal initializing vector 532 and spinup number 534 as were used to create key disk 542 with the module depicted in FIG. 5.

The second inputs to XOR subroutines 830 and 832 are Gammal from data box 535 and Key1 in data box 834 obtained from key disk 160, respectively. The final result is denoted Alpha1 and it is sent to one input of a comparator decision diamond 834.

It is noted that the Gammal vector used to permit access to the system is also the same vector that is used to create Key1 in data box 542. Thus, a random, unknown, but reproducible number, keyup1, has been generated to be XORed with a padded user only known passphrase, the result XORed with a number, Gamma1, located only on a system that has the same system software, and that result XORed with a number, Key1, that only the user has.

The output from XOR subroutine 832 is the input to a set of instructions in process box 836 where the string of characters that forms Alpha1 vector are reversed in their order and form the vector Beta2. Vector Beta 2 is one of the inputs to the first of a second set of three concatenated XOR subroutines (XOR) represented by process boxes 838, 840 and 842. The other input to XOR subroutine 838 is a string called "keyup." Keyup is a random number produced by Spinup Randomizer subroutine 530, described hereinabove with respect to FIG. 5, that uses the same initial input or internal initializing vector 556 and spinup number 558 as were used to create the second of the inputs to key disk 160 with the module depicted in FIG. 5. The result of XOR subroutine 838 is one of the two inputs to the second XOR subroutine 840, the other input being Gamma2, which is the same as Gamma2 discussed above with respect to FIG. 5. Like Gamma1, Gamma2 is provided by system computer program 170 and thus could, if desired, be the same only with those communicating elements on the same communication link. The result of XOR subroutine 840 is one of the two inputs to XOR subroutine 842, the other input being Key2 in data box 560 and obtained from key disk 160.

The output from XOR subroutine 842 is denoted Alpha2 and is the other input to comparator decision diamond 834. If the comparison is positive, that is if Alpha1 and Alpha2 are the same, then Alpha2 is relabeled Gamma (i.e. Gamma 211) in process box 844, Gamma 211 is made available to the rest of the software modules and subroutines at exit port 846, and access is granted to the rest of the software modules. If the output is not the same, then an increment counter 848 is increased and the result is sent to a decision diamond 850. If no more than three tries have been made, the user is given another opportunity to enter his or her passphrase. If this is the fourth try, then the program branches to a memory box 852 where a record is made of the attempt so as to create an audit trail, and the program exits in exit port 852.

Figure 9A:
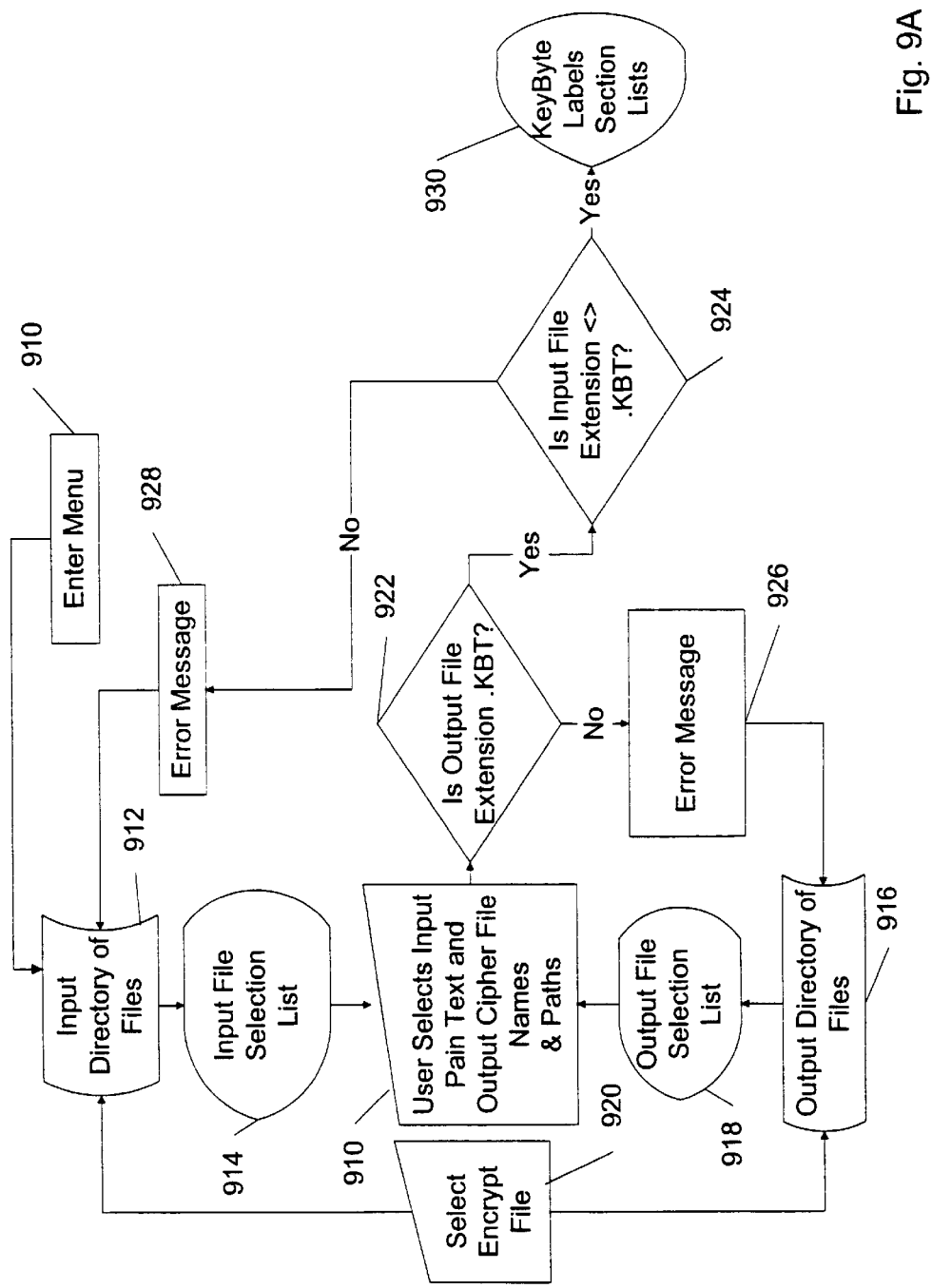
FIG. 9 is a detailed schematic flow chart of the module or subroutine that permits the user to select labels.
Figure 9B:
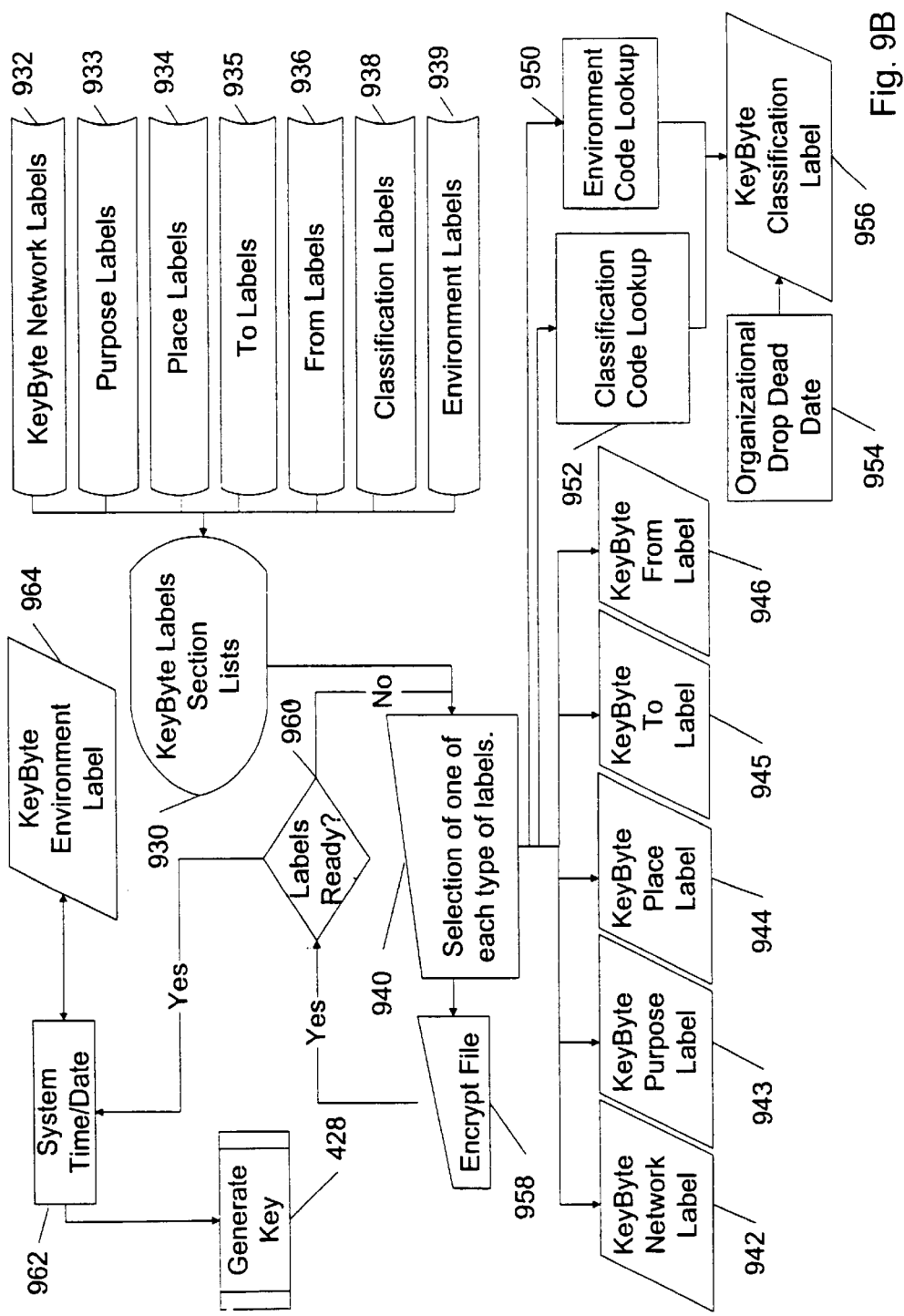

With reference now to FIG. 9, the Label Selection subroutine 420 will now be described. Subroutine 420 is selected when the user indicates that an unencrypted file is to be encrypted and transmitted or stored. Subroutine 420 is entered after access has been granted by Access Control subroutine 210 (see FIG. 8) through an input box 910. Input box 910 also provides a menu to the user to select an input file, usually plain text, or an output file. The menu directs a monitor output of a selection of input files from a disk file 912, as indicated by monitor box 914, or a monitor output of a selection of output encrypted files from a disk file 916, as indicated by monitor box 918. At the same time, the user selects an encryption file, as indicated in input box 920, to be used to encrypt the output file.

It is noted, that should the user desire to create his or her own labels at this point, there is a routine in the Visual Basic software that permits the user to create and store such a label. Thus, the user can run that routine at this point, and then use subroutine 420 to select that newly created label or labels.

As a safety measure to ensure that only properly designated files are used by the program, all file names are required to have a predetermined extension, such as the extension "kbt". The extension of a selected output file is checked in decision diamond 922 and a selected input file is checked in decision diamond 924. If the extension is improper, the program branches to issue an appropriate error message in process box 926 or process box 928, respectively, and the program is returned to provide an output directory file 918 or an input directory file 912, respectively. If the file extension of the selected file is proper, the program continues and provides the user with a menu of the types of label to be selected in monitor box 930. As mentioned above, the present invention has selected seven label types, although a greater or lesser number of types can be used. In the present embodiment, the label types are: network labels 932; purpose labels 933; place labels 934; to labels 935; from labels 936; classification labels 938; and environment labels 939.

The user selects the label group of interest in an input box 940, and as each label is selected from the presented list, or generated by the user at the time, the selected label is stored in an appropriate data output box 942 for the network label, 943 for the purpose label, 944 for the place label, 945 for the to label, and 946 for the from label. However, as indicated in FIG. 3a and 3b above, the classifications and environment labels also contain certain contemporaneously generated information. Thus, when the classification label is selected in input box 940, the selected classification label is sent to process box 950 and 952 where the environment code to be used is looked up and added, and the classification code to be used is looked up and added, respectively. The organizational drop dead date (e.g. the date the file is to be declassified or destroyed) is then added to the modified classification label in process box 954 and the further modified classification label is then stored in a data output box 956. Finally, after the file to be sent is encrypted in user input box 958 (using a conventional algorithm and conventional process, as mentioned above), the program checks in decision diamond 960 that all but the last label, the environment label, have been selected. If all other labels have been selected, then the program branches to a process box 962 where the system time/date stamp are added to the environment label, and the environment label is stored in data output box 962. At this point, the program has had all of the labels selected, and it leaves Label Generation subroutine 420 and enters the Generate Key subroutine 428.

At this point in the description of the present invention, there should be sufficient information to now describe an overview of the entire encryption label key creation program.

Figure 10:
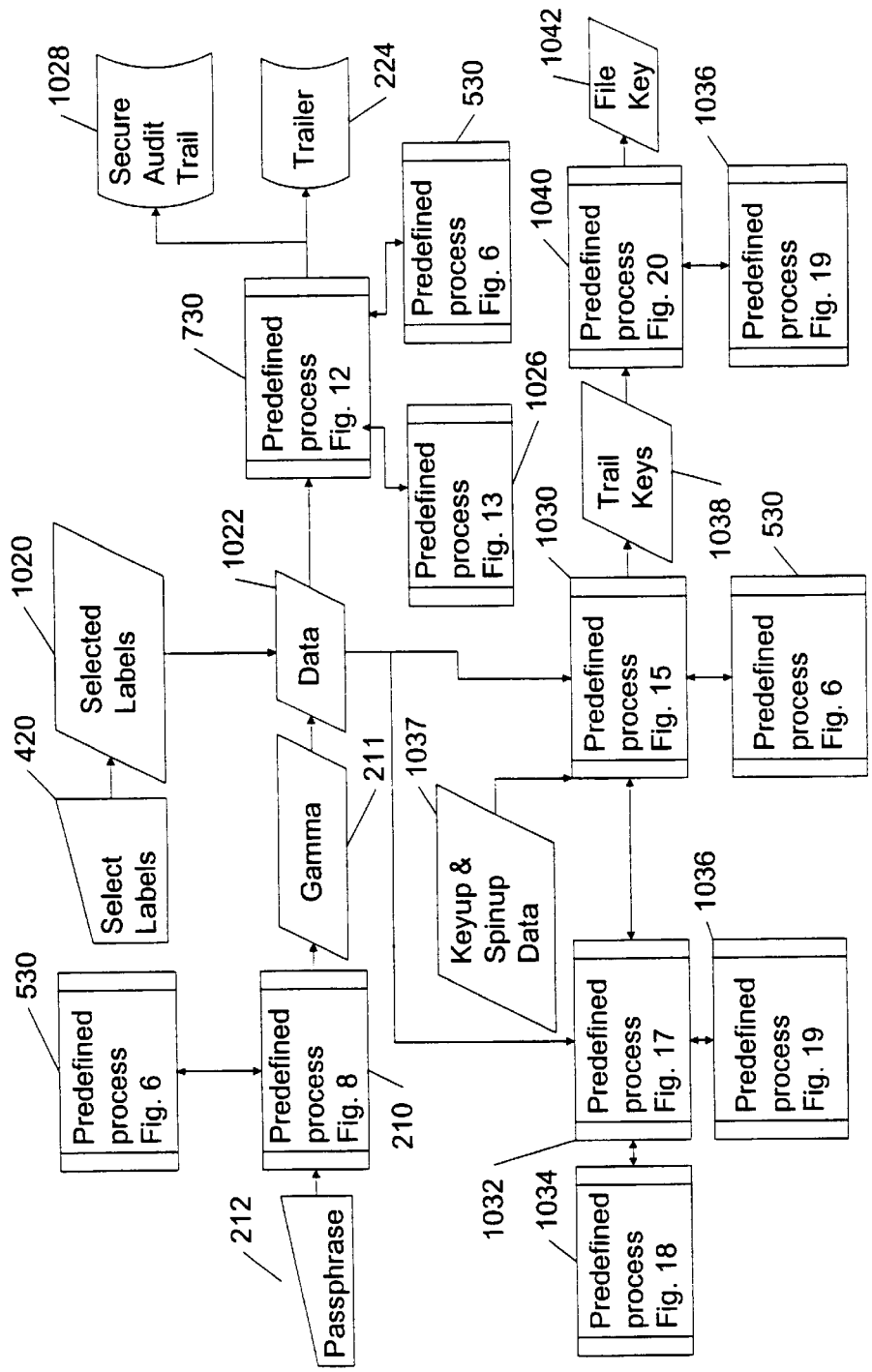
FIG. 10 is an schematic flow chart of an overview of the process used to create an encryped file key and message trailer.

Thus, referring now to FIG. 10 with a comparison being made to FIGS. 4 and 8, a flow chart for encrypting the label keys is depicted. The user calls the system program 170 and enters a passphrase at input box 212. The program proceeds to verify the entered passphrase in the Access Control subroutine 210 which utilizes the Spinup Randomizer subroutine 530 and obtains the Gamma key 211 made available at process box 844. The user selects the desired labels made available in input box 420 and provides the selected labels to the rest of the system at data box 1020. The selected labels together with Gamma key 211 represent the input data at data box 1022. From data box 1022, the program divides into a first part to produce encrypted labels and a second part to produce a file key usable with an encryption algorithm to encode the file. It is noted that a feature of the present invention is that the encryption of a data file need not be done at the time a file key and trailer are created.

To create the trailer, the data in data box 1022 are provided to a Label Element Encryption subroutine 730 which utilizes Spinup Randomizer subroutine 530 and a label lookup table if irrational labels are desired. The spinup number and the initializing vector for Spinup Randomizer subroutine 530 are embedded in and obtained from system software 170, although as stated above, it could be obtained from outside the system. The output from encryption subroutine 730 is provided to a first file storage 224 as a trailer to be concatenated to a file and to a second file storage 1028 as a secure audit trail.

The other path from data box 1022 is provided to a Label Key Generation subroutine 1030 and to a Meld Key subroutine 1032. Meld Key subroutine 1032 takes the software embedded Alpha and Beta keys and the generated Gamma key 211 and encodes them using Spinup Randomizer subroutine 530 and calculated spin numbers derived by Squish subroutine 1034 from the label itself. The encoded key strings are then combined together by a MeldIn subroutine 1036 and provided to subroutine 1030. Subroutine 1030 uses a unique keyup number and initializing vector provided at data box 1037. The result is a plurality of reproducible trailkeys provided by subroutine 1030 at data box 1038 which are respectively unique to each label.

The trailkeys from data box 1038 are provided to a File Key subroutine 1040 where they are all combined by a string combiner process in the MeldIn subroutine 1036, described herein below. The combined result is a single file key provided at data box 1042.

Figure 11:
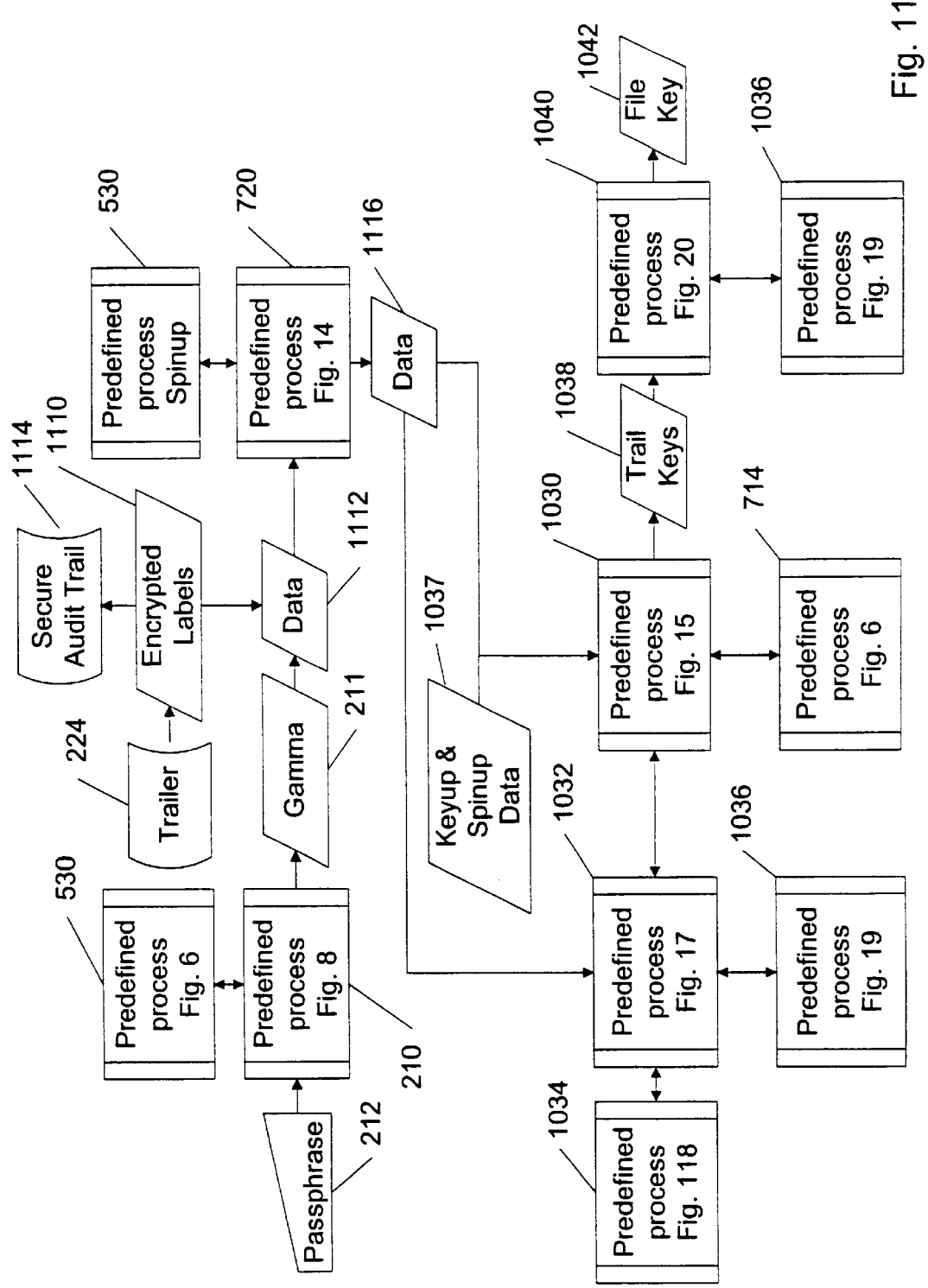
FIG. 11 is an schematic flow chart of an overview of the process used to create the decryption file key.

A somewhat opposite process to the encryption label key creation module is the label key creation decryption module depicted in FIG. 11. The decryption module, however, has sufficient difference to warrant a separate detailed description thereof. However, some initial observations are necessary in order to understand the principles of operation. In order for the label decryption process to have occurred, the same information for access control must have been entered. This does not necessarily mean that the pass phrase must have been the same, since the "pass-phrase vector" compensates for the differences in the pass-phrase, and the "mask" being the same, the same key-up variable is generated. Thus the key-up variable must have been the same when it entered the "Spinup engine" in order for the label decryption process to correctly occur. The Spinup(n) must also be the same. With these elements being the same, and by knowing what Beta(n) and Gamma 211 are, one can determine what Alpha(n) must be and therefore a label can be decrypted.

Also, it is important to realize that all encrypted labels have a fixed length and are placed at the end of an encrypted message in a concatenated relationship. The trailer is used to recover the key that is used in the body of the message. The encrypted trailers (n), where in the present embodiment "n" is equal to seven, have a known, fixed length. An advantage of a fixed length encrypted trailer is that each trailer can be easily identified, separated out and decrypted. In the present embodiment, the length of each trailer element is eighty bytes and thus the length of the entire trailer is seven times eighty or 560 bytes. Thus, because the encryption and decryption processes of the present invention are incremental and separable, the encrypted trailer for the "place," for example, that is trailer number 3 (i.e. n=3), can be isolated with the correct Beta(n) key, the correct Gamma key 211, the correct Spinup number, and the correct keyup variable or initial vector. However, in the present embodiment, the value of the key-up variable is common to each of the label elements (n), although a different variable could be used with each label. Other advantages of using this type of a trailer system is that it is both faster to decrypt and easier to access than a header system. Also this system can be used for routing the information without decrypting the message, and any number of labels can be used in the trailer without significantly affecting the delivery system design. This latter advantage is not true for a header system because such systems require the transfer of the body of the encrypted message to add or delete portions of the file or of the trailer.

Thus, referring now to FIG. 11, with reference to FIG. 10, and also to FIGS. 2 and 8, access to the computer program is obtained by the user entering the passphrase at input box 212. The program proceeds to verify the entered passphrase in the Access Control subroutine 210 which utilizes the same Spinup Randomizer subroutine 530 as described above with respect to FIG. 10. The result is the production of the Gamma key 211 made available at process box 844.

Once, access to the program is granted and the appropriate selections are made, the program obtains the trailer portion 212 of the message to be decrypted, indicated as being on disk in FIG. 11, but which could be obtained from other sources, such as from RAM 132 having been stored therein directly from an input from modem 142. The program then strips off the encrypted label portion, as indicated in data box 1110 to provide data in data box 1112 and also provide a secure audit trail 1114 indicated as being stored on disk. The required portions of the encrypted label portion are then selected by the program and provided in data box 1112.

The program then branches to a called subroutine, the Label Element Decryption subroutine 720, which uses gamma key 211 and the encrypted data 1112 to produce decrypted label information data as indicated in data box 1116. The Label Element Decryption subroutine 720 is described hereinbelow with respect to FIG. 14. The remainder of the program is identical to that of FIG. 10 with the result that a file key is made available in data box 1042.

The Label Element Encryption subroutine 730, called by the Encryption Label Key Creation routine described in FIG. 10, will now be described with reference to FIG. 12. The user enters the subroutine by making a selection in input box 1210 (shown in the upper right of FIG. 12) to either enter the user's own rational label, such as one depicted in FIG. 3a, or to proceed to a Label Lookup subroutine 1212, depicted schematically in FIG. 13 and described hereinbelow. Subroutine 1212 permits the user to select a rational label from a plurality of pre-stored labels and then to associate an irrational key variable 1214, shown stored on a hard disk, such as hard disk 134, FIG. 1. In most cases the association is simply a one-to-one correspondence that is available in a look-up table. In either case, a rational, literal, and/or meaningful string label that can be read and perhaps remembered by the user, can be selected.

The program then selects the label chosen in process box 1216 and provides it as an ASCII alphanumeric string to process box 1218 where the program pads the selected label to 20 characters. The padding is done by generating a pseudo-random number, spinup key 1220, in Spinup Randomizer subroutine 530, described above with respect to FIG. 6. In this embodiment, an initializing vector used in Label Element Encryption subroutine 730 is provided by input box 1222 and is the serial number of network, but it could be the called serial number of the computer being used (if available on the particular computer) or simply an embedded number in the program. The spinup number, which as described above is an integer and is the number of cycles through the spinning steps that are used in subroutine 530, is also an embedded number provided at input box 1224. The resulting output, as previously mentioned, is provided at output box 1220 as the spinup key as an ASCII number. The padding in this embodiment, as depicted in FIG. 3, is a simple concatenation, but it could be done by a mathematical operation, such as an ORing, ANDing or EXCLUSIVE ORing.

From the padding process box 1218, the program proceeds to a plurality of serially connected EXCLUSIVE OR (sometimes denoted XOR) steps. As stated above, the purpose of the labels are to maintain the rationality or reasons for the encryption of the host system files in order to specify the sensitivity of decrypting the file within the constraints of many situations and conditions. This rationality goes with each encrypted file in the form of an encrypted trailer of fixed size having a plurality of encrypted labels. For simplification, the designator "n" is used to identify the explicit label being handled. The internal designation used for the different labels are: the input rational label, the (nth) label, the Alpha(n) key or label, the Beta(n) key or label, and the Gamma key or vector 211. The Alpha(n) key, the Beta(n) key, and the Gamma key 211 are all XORed together along with the product of the vector produced by the Spinup engine subroutine. When all are properly XORed, the encrypted label (n) is created.

In the first stage of the EXCLUSIVE OR encryption stages, the padded number from process box 1218 is XORed in process box 1226 with the ASCII representation of an embedded key, denoted the Alpha Key and provided in data box 1228. The product of this EXCLUSIVE Oring is then EXCLUSIVE ORed in process box 1230 with the ASCII representation of a second embedded key, denoted the Beta Key and provided in data box 1232. A third EXCLUSIVE Oring occurs in process box 1234 with the product of process box 1230 and Gamma key 211, produced in the Access Control subroutine 210, FIG. 8.

The result of the EXCLUSIVE ORing in process box 1234 is then is used as an input to a register or an output data box 1236 in which the result of the particular label's encryption is stored. The subroutine is repeated for each of the labels (which is seven in the embodiment depicted in FIG. 3), and all of the results are concatenated together to form an encrypted, fixed size rational trailer label.

Figure 13:
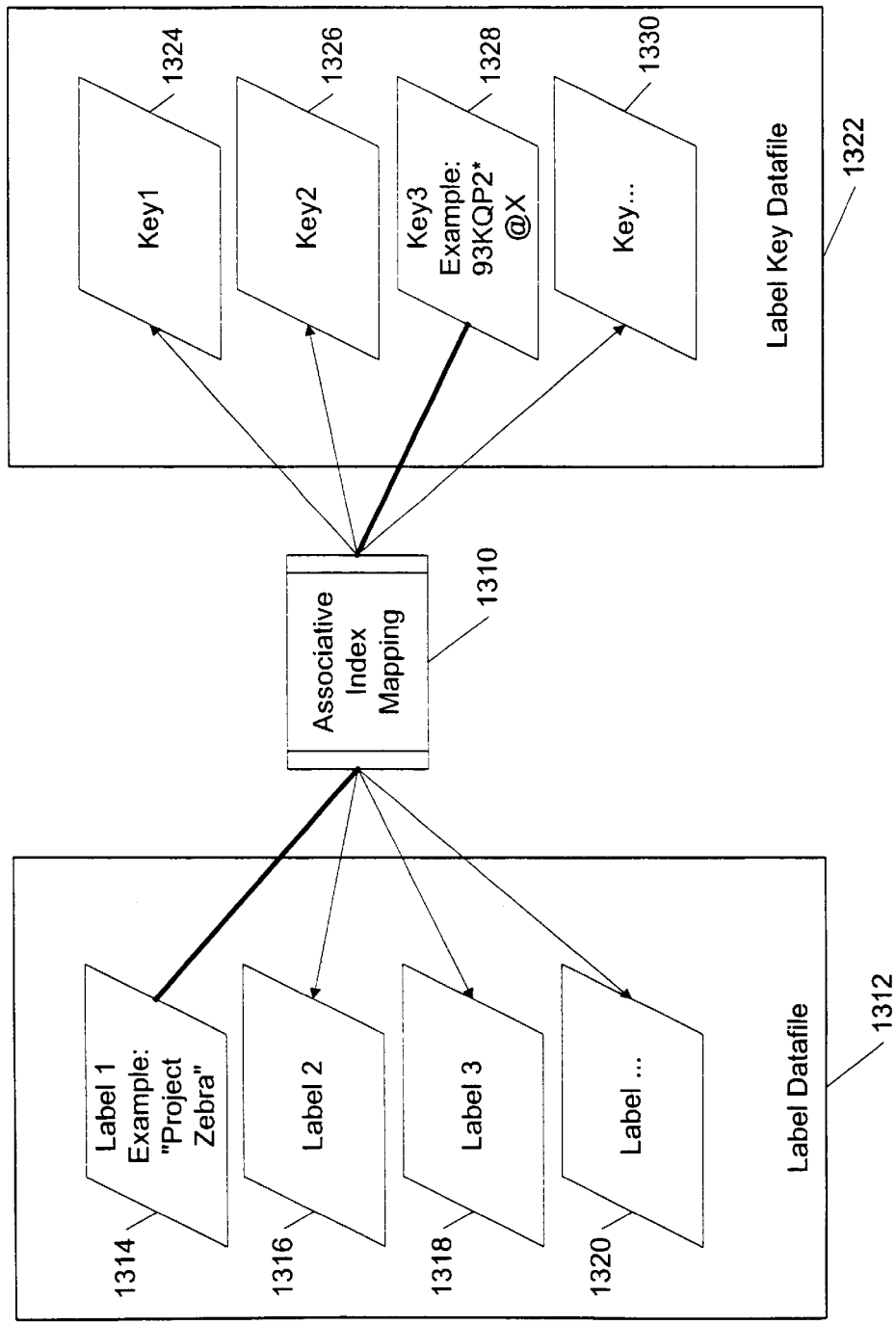
FIG. 13 is a schematic diagram detailing the label lookup process.

With reference now to FIG. 13, the Label Lookup subroutine 1212 used in the Label Element Encryption subroutine 730 of FIG. 12, will now be described. In the present embodiment, the label system uses three associated variables or keys to encrypt or build each label and there are a total of seven different labels. Therefore, there are twenty-one independent variables associated with the labels. As mentioned above, the seven labels represent the rational for securing the individual file and indicate the sensitivity of the file by describing who to, who from, the purpose of the message or file, the network on which the file will be transferred, the classification of the file, the place where the file is to go, and the environment in which the file is allowed to be presented.

When subroutine 1212 is called by subroutine 730, the program enters an Associative Index Mapping subroutine 1310. Subroutine 1310 incorporates a sorted table that relates each available label to the corresponding label key for the purpose of allowing users to select a coded, irrational, associated input variable used in place of the actual rational label. Subroutine 1310 first gets a Label Data file 1312 from hard disk memory 134 and stores it in the computer's RAM memory 132. Label Datafile 1312 is comprised of a plurality of pre-established, rational labels 1314, 1316, 1318, and 1320. Then subroutine 1310 presents the data to the user on monitor 140, and/or prints out the data on a connected printer (not shown in FIG. 1). When the user selects a pre-established label, the associative index mapping subroutine 1310, using a Label Key Datafile look-up table 1322, provides an associated irrational label, such as one of keys 1324, 1326, 1328 and 1330.

The program flow of the Label Element Decryption subroutine 720 have been described above with respect to FIG. 7b, but the details thereof are depicted in FIG. 14. The input to Label Element Decryption subroutine 720 is the encrypted label trailer 1112. Subroutine 720 first determines the length of the label trailer by counting the number of bytes in process box 1410 and then in process box 1410 selects the first four elements from label 1112. The selected four elements are then tested in decision diamond 1414 to determine if the string is odd or even.

If the string is even, then subroutine 720 branches to process box 1416 where the program selects the second and third elements and strips the least significant character and transfers the result to a data input box 1418. On the other hand, if the value of the selected elements is odd, then the program branches to the process box 1420 where the least significant element is stripped off and the first three elements are transferred to data input box 1418.

The rational for the decryption program flow is to perform the steps opposite to the encryption steps. For example, in encrypting the various alphanumeric elements of the label network portion 330 "BLUENETWORKEASTXXXXX" (FIG. 3), the encrypted packed string could be "9338 1201 5176" for the elements "B," "L," and "U." The encrypting packing subroutine determines if the resulting encryption of an element is three or two digits. If three digits, then the encryption is packed with a random odd least significant digit, and if two digits, then the encryption is packed with a random even least significant digit and with a random most significant digit. Thus, in the above example, the above described subroutine would strip the packed numbers to yield:

"33 120 17".

In either the odd number case or the even number case, the value in the input box 1418, sometimes referred to as the keyup value, is used as the variable input to a three EXCLUSIVE OR gates (or XOR gates), 1420, 1422, and 1424 which are connected in series. Thus, the output of one XOR gate serves as one of the two inputs to the next XOR gate, with the first input being the keyup value 1418, and the other of the two inputs being the Alpha key 1228, the Beta key 1232 and the Gamma key 211, respectively. The output of the last XOR gate is the input to a decrypted element data input box 1426, the output of which is stored in a process box 1428 as the first portion of the padded, decrypted label. Process box 1428 is essentially a software register where succeeding elements are concatenated to the previous element.

From process box 1428, the program proceeds to a decision diamond 1430 where a count of the number of elements decrypted is kept and compared with the length of the label trailer determined in process box 1410. Also in decision diamond 1430, a determination is made whether all of the label elements have been decrypted. If not, the program branches back to process box 1412 where the next four elements from the label trailer 1112 are selected for processing. If all of the label elements have been decrypted, then the program branches to a process box 1432 where the padding from the concatenated product of process box 1428 is removed. The result is provided to data output box 1434 as the decrypted label. In order to remove the padding from the concatenated product, the reverse of the padding process performed in the Label Element Encryption subroutine 730 (described with respect to FIG. 12) is done. A spinup number 1224 is used to determine the number of cycles that are performed in Spinup Randomizer subroutine 530, and the same internal initializing vector, which is the network serial number, is used as the input to subroutine 530.

Figure 15:
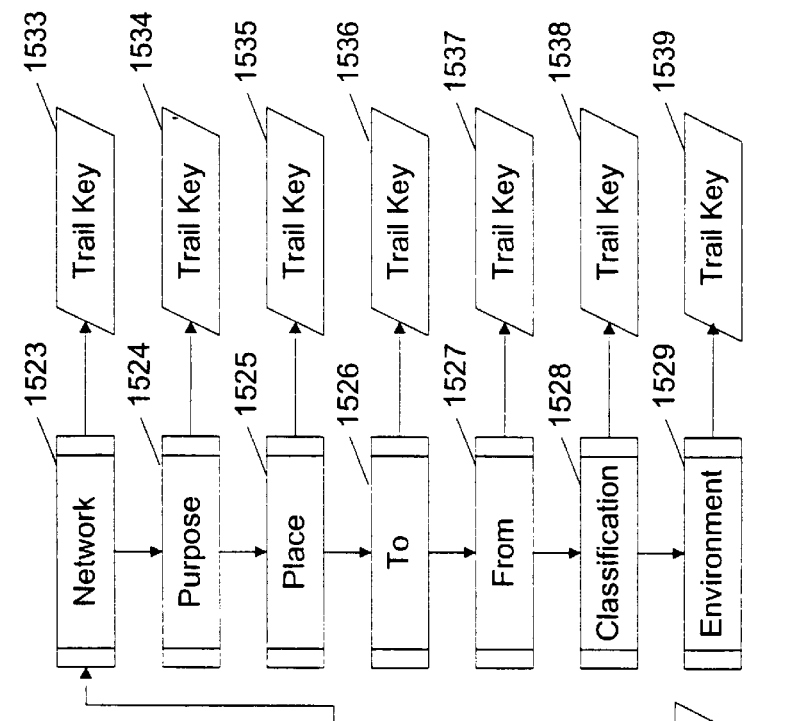
FIG. 15 is a general schematic flow chart of a module that uses the labels generated by the label selection and generation module of FIG. 9 and in turn generates label trailkeys.

The generation of the key used in the encryption algorithm will now be described with reference to FIGS. 15 through 20. FIG. 15 discloses the Label Key Generation subroutine 746. Subroutine 746 uses a unique keyup or initializing vector from input data box 1520 and a unique spinup number from input data box 1522 in Spinup Randomizer subroutine 530 to generate an input keyup for each of a plurality of Label subroutines 1523, 1524, 1525, 1526, 1527, 1528 and 1529. The output from each of the Label subroutines is a trailkey stored in respective output data boxes 1533, 1534, 1535, 1536, 1537, 1538, and 1539.

Figure 16:
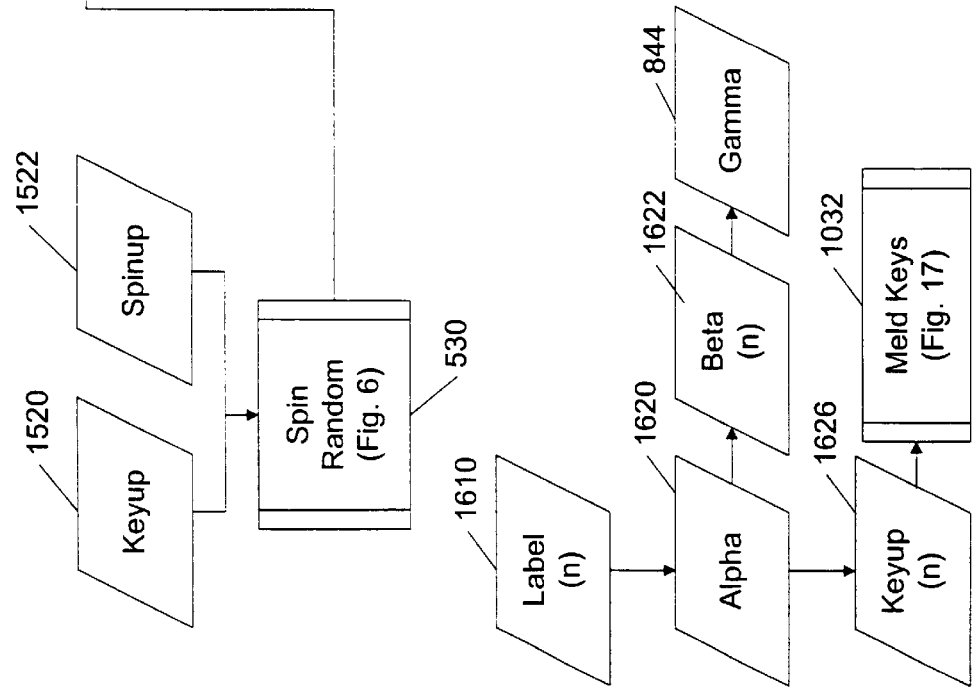
FIG. 16 is a schematic flow chart of a subroutine used in FIG. 15.

Each Label subroutine, depicted in FIG. 16, is substantially the same and thus will be described in general. Essentially, the label subroutine is comprised of MeldKeys subroutine 1032 with four inputs. The labels from FIG. 9 are correspondingly used in turn as an input in FIG. 16, and for convenience are denoted in FIG. 16 as 1610. A particular label is identified as "n," and in the present embodiment "n" goes from one to seven to identify each of the seven labels. Label 1610 is redesignated in FIG. 16 as Alpha key 1620. A second input in each Label subroutines 1523, 1524, 1525, 1526, 1527, 1528 and 1529 is an individual Beta key for each subroutine 1622, denoted Beta(n) 1622, where "n" is the same as that used for the labels. At this time in the preferred embodiment, Beta(n) is a meaningless, embedded vector, but as should be obvious to those skilled in the art, Beta(n) could have some rational meaning or purpose. A third input is Gamma key 211, and thus it will be the same for each label subroutine. The last input to each label subroutine is a keyup vector 1626 designated keyup(n). Where keyup(1) vector 1626 is the same as keyup 1520 in FIG. 15 for the first run label subroutine 1523 (the Network label), keyup(n) vector 1626 for the other six label subroutines is the trailkey 1533–1538 generated for the previous label subroutine. For example, keyup(2) 1626 in FIG. 16 (the Purpose keyup) is Network Trailkey 1533 and keyup(7) is Classification Trailkey 1538.

Figure 17:
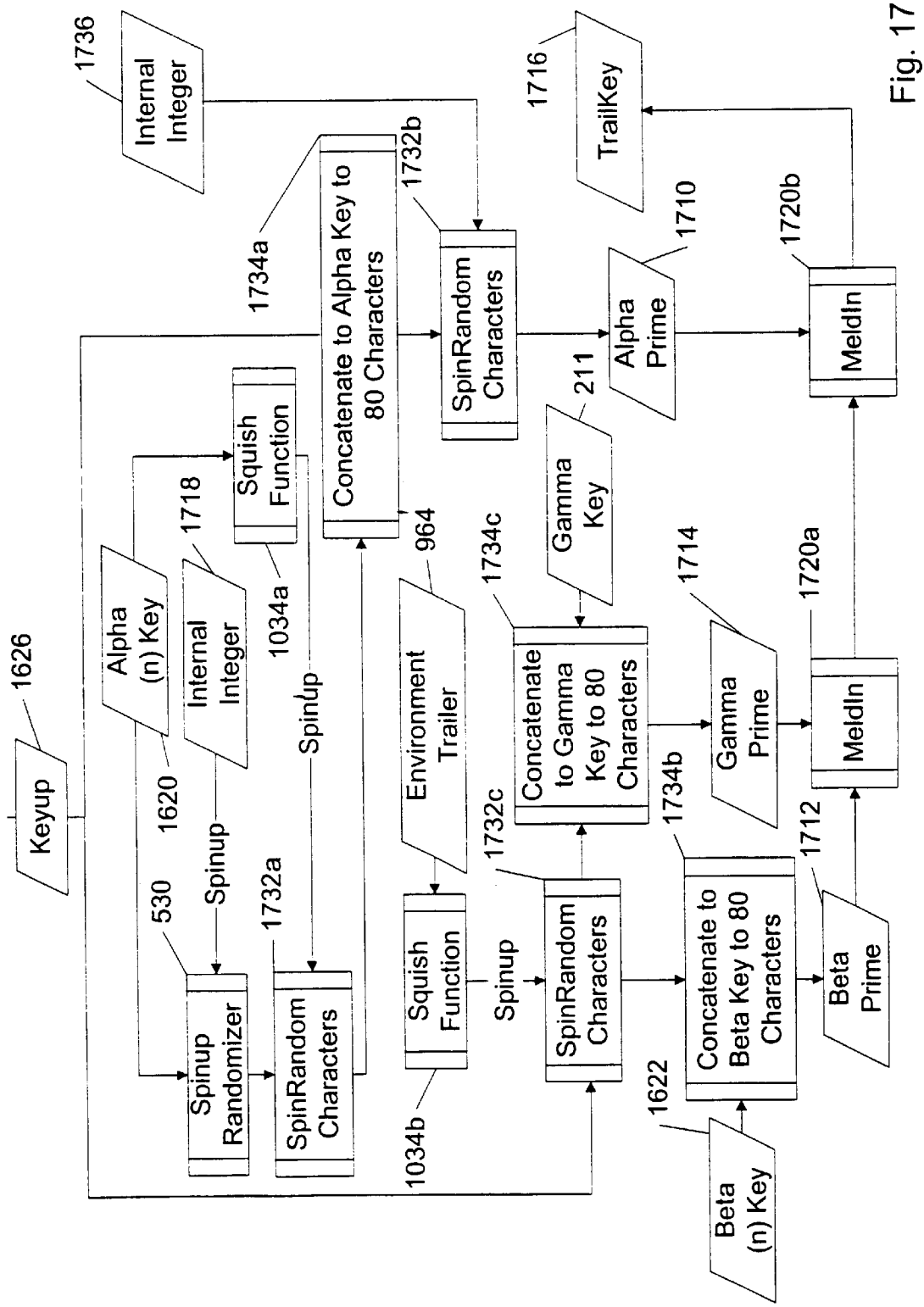
FIG. 17 is a schematic flow chart of a subroutine used in FIG. 15 to generate a trailkey.

With reference now to FIG. 17, the Meld Keys subroutine 1032 will now be described. The purpose of Meld Keys subroutine 1032 is to produce a corresponding unique key or vector, called here a trailkey, representative of each label 330, 332, 334, 336, 338, 340 and 342 by using a one-way process. Each trailkey is a unique, reproducible, pseudorandom, non-reversible key or vector that maintains a suitable representation of the input values.

As an overview, Meld Keys subroutine 1032 does this by packing each label (here called Alpha key 1620) to 80 characters with a filler from keyup 1626 using a well known concatenation subroutine, which could simply be a programming command (for Visual Basic the command is MID$), the packed label being called Alpha Prime 1710. This process is repeated for each unique Beta(n) key 1622 to produce a Beta Prime vector 1712; and again repeated each time for Gamma key 211 (produced by Access Control subroutine 210) to produce a Gamma Prime vector 1714. Then the three packed keys, Alpha Prime 1710, Beta Prime 1712 and Gamma Prime 1714, are folded together, that is combined, to produce one key, a trailkey 1716, for each label. The trailkeys are then combined, as described below with reference to FIG. 20, to produce a single file key that is used to initiate the selected encryption algorithm.

In this way, the produced trailkeys and the file key are 100 percent relational to the labels that generated them (i.e. the key has a flat representative function). Although the combination of the keys can be done in a number of ways, in this particular embodiment, Beta Prime key 1712 and Gamma Prime key 1714 are first combined using a bit-by-bit XOR in a MeldIn subroutine 1720, denoted 1720a and described hereinbelow with respect to the description of FIG. 18. MeldIn subroutine 1720a produces an intermediate product having the same length as one of the original keys, and is then combined using a bit-by-bit XOR with Alpha Prime key 1710 in MeldIn subroutine 1720b to produce Key 1716, which also has the same length as the intermediate product and the three input1 primed keys, Alpha' key 1710, Beta' key 1712 and Gamma' key 1714.

The process of creating or making the primed Alpha, Beta and Gamma keys from the unprimed keys will now be described. First, Alpha key 1620 is subjected to Spinup Randomizer subroutine 530 (see FIG. 6) for a predetermined number of spins determined by an internal integer 1718, which in the preferred embodiment is one, but which as one skilled in the art can appreciate could be generated, such as by a Squish Function subroutine 1034a. Because of the operation of process box 648 in Spinup Randomizer subroutine 530, the output from Spinup Randomizer subroutine 530 will be the ASCII representation of an integer. The output of subroutine 530 is used as the input to a SpinRandom Characters subroutine, which at this point in the program is denoted 1732a. The SpinRandom Characters Subroutine is identical to Spinup Randomizer subroutine 530 (FIG. 6), except that process box 648 (FIG. 6) which performs the modulo 10 arithmetic is not used. Thus, it is possible to generate all ASCII characters in process box 650 (FIG. 6) and to provide them as an output from the SpinRandom Characters subroutine. The number of spins of subroutine 1732a is determined by an integer from 1 to 9 from Squish subroutine 1034a, described hereinbelow with respect to the description of FIG. 18. The number of spins is limited here only in the interest of the time that it takes to operate subroutine 1732 and in a faster computer could be larger than a single digit integer. The output of subroutine 1732a is used as the input to a conventional concatenation subroutine 1734a, the packing or filler input of which is keyup 1626. The output from subroutine 1734a is provided as the input vector to a second SpinRandom Characters subroutine 1732b. The spinup number for subroutine 1732b is determined by an embedded internal integer 1736, which for the presently preferred embodiment at this time is one, and thus is the same as internal integer 1718. The output from subroutine 1732a is Alpha Prime 1710.

The packed vectors Beta Prime 1712 and Gamma Prime 1714 are created in a similar way. Keyup 1626 is used as the input to a SpinRandom Characters subroutine 1732c. The spinup number, which in this embodiment is a single digit integer (but as mentioned above could be larger), is generated by a Squish Function 1034b from the unpacked Environment Label, called here the Environment Trailer 964. The output from SpinRandom Characters subroutine 1732c is used as the filler or packing input to a Concatenation subroutine 1732b and a second Concatenation subroutine 1734c. The vector to be packed by sphroutines 1734b and 1734c are Beta(n) key 1622 and Gamma key 211, respectively, and the outputs are Beta Prime key 1712 and Gamma Prime key 1714. The Environment label is used to generate the spinup number because it contains the unique time and date at which the file is being encrypted and thus represents a rational connection to the particular encrypted file. It should be obvious that changing any of the Spinup values results in a dramatic change in the output key. Such internal Spinup integers are designed to contain values independent of the others and capable of being derived from external or internal sources or computations, such as by Squish Function 1034.

Squish subroutine 1034 is depicted in FIG. 18. The purpose of Squish subroutine is to take a multi-element string input and reduce it, in a reproducible manner, to a single integer. The input string is received in an input data box 1810. Then, in a process box 1812 an iteration counter (which is essentially just a memory storage location and is not separately shown) is initialized and the accumulated total of a Last Accumulated Total totalizer (which also is essentially just a memory storage location and is not separately shown) is set to zero. The program proceeds to a conventional subroutine 1818 to determine the number of elements in input string 1810. The program then enters the reiteration portion of Squish subroutine 1034 at a decision diamond 1820 to determine if the number in the iteration counter is greater than the number of elements in the input string.

Initially, the answer will be "no," and thus the subroutine branches to a process box 1822. In process box 1822, subroutine 1034 adds the integer at the iteration location to the number in the totalizer. Next, the subroutine proceeds to a decision diamond 1826 which determines whether the iteration is greater than the number of elements in the input string. If the answer is no, the subroutine branches back to process box 1822 to begin the loop again. If the answer in decision diamond 1826 is yes, then the subroutine branches to a process box 1828 which sets the last accumulated total to equal the current accumulated total.

Squish subroutine 1034 then continues to a decision diamond 1830 which determines if the number in the totalizer is greater than one. If so, subroutine 1034 loops back to decision diamond 1820. If the answer is "no," then the process is completed and the resulting integer is stored in an output data box 1834.

As an example, suppose that the input sting of numbers in box 1810 has initially only 3 digits, namely 653. When the subroutine enters decision diamond 1820, the iteration counter will have been initialized to one by process box 1812 and since the number of elements in the input string is three, the subroutine will drop down to process box 1822. The integer at the first iteration location is "6" and this is added in process box 1822 to the Accumulated Total which has been initialized at zero. Thus the new total is now 6. The subroutine then proceeds to process box 1824 which increments the iteration counter and then to decision diamond 1826 which takes the "no" branch because the iteration count is now 2, which is not greater than the number of elements in the string, which is 3. The subroutine again enters process box 1822 and now the iteration location (which is now 2) has the number 5. This is added to the present Accumulated Total of 6 to yield 11. In a similar program flow, the next trip around the loop will yield an Accumulated Total of 14 (11+3). After this third trip around the loop, the iteration number will now be 4 which is greater than the number of string elements which is 3 and the program branches to decision diamond 1830.

Now the Accumulated Total has two digits (a "1" and a "4") so the program will branch back to decision diamond 1820. The iteration counter not having been reset is now at 3 and thus the subroutine will branch to process box 1832. Here the subroutine again initializes the iteration counter to 1 and the Last Accumulated Total to 0 and it proceeds through the "no" branch of decision diamond 1826 (iteration is now 1 and the new number of string elements is 2). By looping twice the result in the Accumulated Total is "5" (1+4) and is a single digit. Therefore, when the subroutine again enters decision diamond 1830, the result will be "no" and the program will finally end at output data box 1834. Thus, by successive additions of the elements in the input string, the result will be a single digit.

MeldIn subroutine 1720 is depicted in FIG. 19. The function of subroutine 1720 is to combine two separate strings of the same or different length in a reproducible manner into one string having the length of the longer string.

Initially, in steps that are not depicted, a software shift register is initialized to zero and the subroutine loads in parallel each stage of a primary serial-parallel shift register 1910 having "n+1" stages with a first, primary input string and each stage of a secondary serial-parallel shift register 1912 having "n+1" stages with a second, secondary input string. For example, as seen in FIG. 17, a primary string is Alpha' key 1710 or the output from the first MeldIn subroutine 1720, and a secondary string is Beta' key 1712 or Gamma' key 1712. The outputs from Data n+1 stage of each shift register 1910 and 1912 are used as inputs to a subroutine 1914 and 1916, respectively, which convert the value in the data n+1 stage to its ASCII value. Then the elements in each shift register 1910 and 1912 are shifted one place to the right. The output from subroutines 1914 and 1916 are then EXCLUSIVE ORed together in process box 1918 and the counter is advanced one count in process box 1920. Since this is the initial looping, the output from XOR process box 1918 is a one and is stored as an integer in data output box 1922.

The integer in data output box 1922 is then converted to its ASCII character in process box 1924 and concatenated onto a string in a register process box 1926. The subroutine in decision diamond 1928 then checks to see if the count in the Counter is equal to the length of the string in shift register 1910. Since the length of the strings used in Meld Keys subroutine 1032 (FIG. 17) and entered into shift register 1910 is 80, having been packed to that length by subroutine 1732, the result of the test in decision diamond 1928 will be a "NO" on the first loop. Thus, the subroutine 1720 proceeds to process box 1930 where the ASCII character produced in process box 1924 is loaded into the first stage of secondary shift register 1912 and both shift registers 1912 and 1910 are shifted one stage to the right. After 80 iterations, the length of the string in process box 1926 will be 80 and the count in the Counter will be 80. Therefore, the result in decision diamond 1928 will be a "YES" and the program will branch to load the product in process box 1926 into data output box 1932 as the MeldProduct. The MeldProduct produced by the second MeldIn subroutine 1720 in the Meld Keys subroutine 1032 of FIG. 17 is a trailkey for the particular label.

It can be seen that the length of the secondary string loaded into register 1912 can be shorter than the primary string loaded into register 1910 because extra characters are added to the end of the secondary string by process box 1930 to make up, automatically, for any length difference.

The production of file key 1042 is shown in FIG. 20. The first two trailkeys, 1533 and 1534 are combined in a first use of MeldIn subroutine and then the result of that combination is used as the primary string input to a second MeldIn subroutine 1720b where the secondary string input is the next trailkey, in this case the place trailkey 1535. This process of using the result of a previous MeldIn subroutine 1720(n) as the primary sting input to the next MeldIn subroutine 1720(n+1) is repeated until all trailkeys are used in turn. The last step produces File Key 1042. In FIG. 20, trailkey 2010 is depicted to illustrate that any number of trailkeys (and thus labels) can be used and the number is not limited to the seven in the presently preferred embodiment.

As mentioned above, the present invention contemplates the changing or rekeying of the files on keydisk 160 by an incoming message and the changing of keys, spinups, and embedded initializing vectors. This procedure is desirable in order to increase overall system security by shortening the life of a key, and is also desirable in order to destroy the ability of a presently unauthorized user to use the system. The software to accomplish this is a Rekey and Relabel subroutine 2100 depicted in FIG. 21.

Subroutine 2100 can be inserted in the program depicted in FIG. 2 between Label Decryption subroutine 232 and Key Creation Combiner subroutine 234. An incoming message 230 is being decrypted by decryption subroutine 232. After the trailer has been decrypted, the subroutine 2100 enters decision diamond 2110 where the decrypted Purpose label is checked to determine if that label has a predetermined series of characters, such as "REKEYKEYBYTE." If it does not, the program branches out of subroutine 2100 to process box 2112 where the program is directed to continue with the decryption process described hereinabove with respect to FIG. 3. If the comparison in decision diamond 2110 is "yes," then the subroutine proceeds to a Label Element Decryption subroutine 2114, which then proceeds to decrypt the trailer file on KeyDisk 160. This decryption requires the use of the rekey file trailer labels which are obtained from keydisk 160.

From process box 2114, subroutine 2100 proceeds to two decision diamonds 2116 and 2118 where the program checks for proper authorization for the rekey. In decision diamond 2116, the subroutine determines if the Rekey Command Label matches the Purpose label, and if it does, then the subroutine is permitted to proceed. If it does not, then the subroutine branches to a subroutine 2120 where the program issues a Rekey Error to the User and Writes the error to an audit trail. Similarly, in decision diamond 2116, the subroutine determines if the From label of the rekey message matches the Authorization label in the rekey file located on the keydisk. If the two are the same, the subroutine proceeds to subroutine 2122 which writes the decrypted message file to the keydisk and then to subroutine 2124 which issues a rekey message and writes a message to the audit trail. If the two labels are not the same, the subroutine branches to subroutine 2120, as described above.

In addition to changing the files on the keydisk, subroutine 2122 can also change any internal vector or key in the system. In this way, the user can be kept up to date, or an improper user's program can be disabled.

The specification has now described a presently preferred embodiment of the present invention in which a unique transactional key can be generated to initialize a conventional encryption algorithm and seven labels can be encrypted and concatenated to the encrypted message as a trailer. In creating the trailer, key labels from the Network, Purpose, Place, To, From, Classification and Environment categories must exist or be created first. The relationship between any selection of labels contains sufficient information to explain the justification or "story" surrounding the encryption of the message. However, in some circumstances the justification may be acceptable and in some it may not be acceptable. For example, a message may have a minor sensitivity when communicated between two persons through a given network to a given place, but the same message, to and from the same persons may have a high sensitivity when passed through a different network to a different place. The present invention includes a system for producing "sensitivity factors" that can be used to prevent harmful combinations of labels, and thus prevent a harmful message from being sent in the selected combination of categories.

An analysis of all of the labels with respect to the operational environment, and within their respective label categories can be made in advance to produce rational "sensitivity" weights assigned to specific labels. Further separate analysis of the label categories, in context with the organizational security policies of the participants in the network, can be used to produce "sensitivity factors" that in turn can be used to prevent harmful combinations.

In order to implement such a check, the present invention utilizes a rule-based expert system approach. Two different kinds of if-then-else rules are stored in separate databases. A first database stores a plurality of associated label weight rules that are used to calculate a selected label's final weight as a function of that label's initial weight and one or more other label that have been selected. A second database stores a plurality of label weight acceptance rules that are used to determine the overall acceptability of the label combinations as a function of the calculated final label weights. These rules are fired sequentially to calculate a related weighted value of perspective label combinations.

An example of a rule in the first database can be:

IF [Weight(label 5)]>7 AND [Weight(label 3)]<5,

THEN [Weight(label 3)]=3×[Weight(label 3)] AND [Weight(label 5)]=2×[Weight(label 5)].

In words, this rule can be translated to say that originally if the selected From Label has an assigned weight of "8" or more and the selected Place Label has an assigned weight of from "0" to "4", then the final weights of both of these labels will be changed to increase both label weights. The weight of the From Label will be increased by a factor of two and the weight of the Place Label will be increased by a factor of three. Thus, the mere fact that the From and Place labels have certain thresholds of sensitivity and both are being used together increases both of their final sensitivities. In combination with the evaluation rules, this combination could have easily excluded the particular label combination from being allowed. However, the particular rule could just as well have reduced the sensitivity of one or both the weights of the labels.

An example of a rule in the second database can be:

[Weight(label 5)]>7 AND [Weight(label 3)]<5,

IF, SUM [Weight(label n),n=1 to 7]>[Weight(label 4),

THEN [Show Message: "Label Selections Not Allowed"];

AND Reset Label Selections To [Null];

AND Initialize Sum to [0];

AND Restart Label Creation Process;

ELSE Write label combination to associated label database.

In words, this rule can be translated to say that if the sums of the final weights of all of the labels is greater than the final weight of the To Label, then an error message will be typed to the monitor's screen (or printed out) and all of the label selection will be nullified, the sum of the final weights will be initialized to zero and the label creation subroutine will be restated. If the sums of the final weights are less than the final weight of the To Label, the label combination is allowed and the combination will be written to an associated label database.

Obviously, any number of databases can be used to make different numbers of label categories. For example, within the label association process, eight separate databases can be used. Seven of the databases contain the label records for the corresponding label category and each record contains a text field for the paticular label and an integer field for the weight of that label. The eight database contains the records of the previously selected labels. Each record has seven text fields to store the seven associated labels and a date/time field to store the "drop dead" date and time of the record.

These rules can be tailored for the organizational environment according to the local organizational operational policies. The summed sensitivity threshold that can be set may, for example, be used to prevent the use of certain label combinations on certain days, by certain people of appropriate rank, and at different locations. The disclosed expert system type of analysis is only one such possibility, and other types, such as neural networks, fuzzy logic systems, or a genetic algorithm methods, could be used instead. Also, if an expert system or rule based evaluation system is used, the rules could be executed external to the present system.

Figure 22:
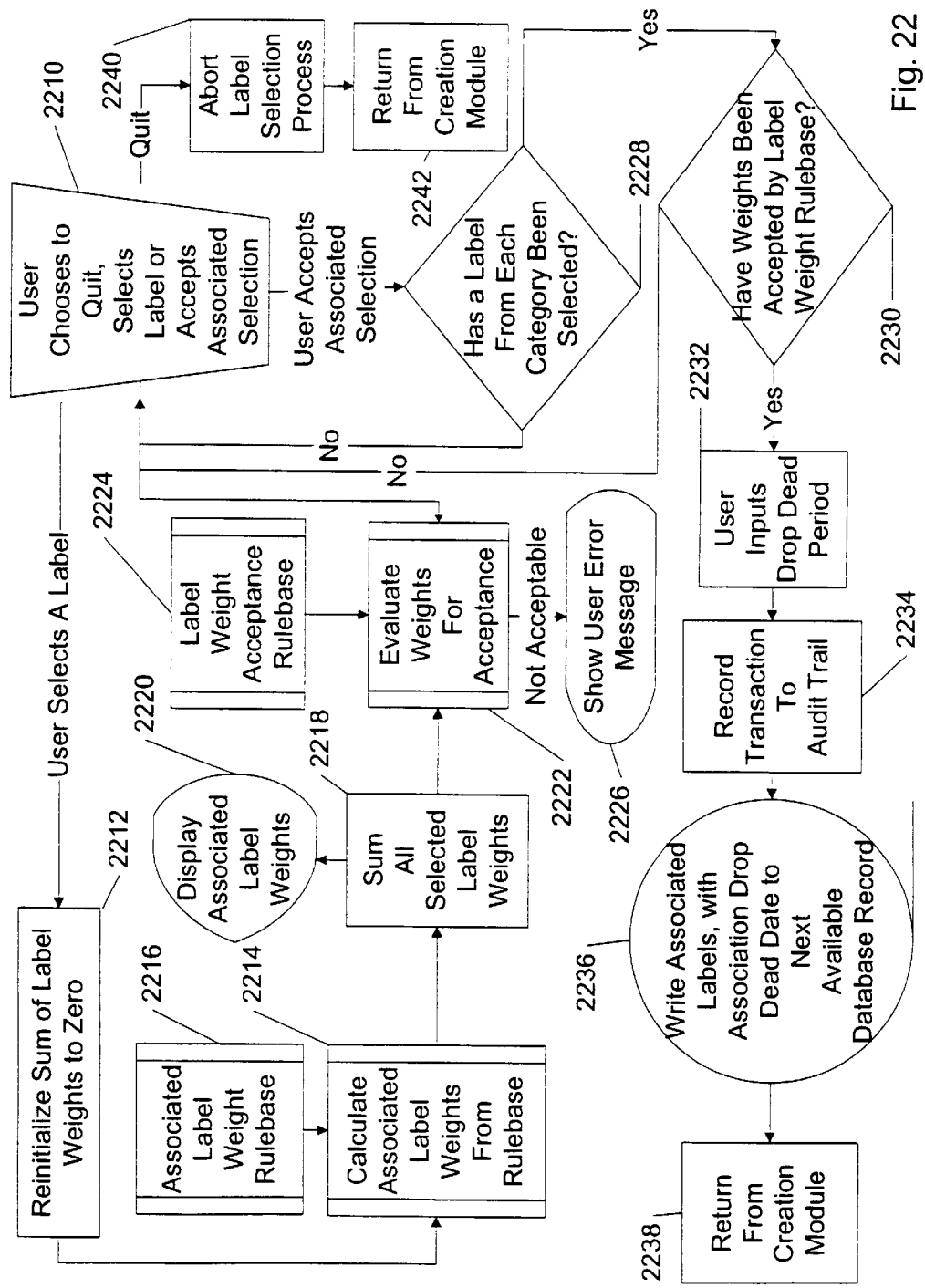
FIG. 22 is a schematic flow chart of an expert systems subroutine used to determine the weights of selected labels and whether the selected combination of labels are acceptable.

With reference now to FIG. 22, an expert system subroutine for checking the combination of selected labels is disclosed. Initially, the user selects a label from any of the unassociated Label databases 932 to 939 in manual input box 2210. The program branches upwardly to a process box 2212 where the sum of the label weights is initialized to zero. Then the program proceeds to a subroutine box 2214 where the program, based on the selected label, selects the appropriate rules to use from an Associated label Weight Rulebase 2216. Since there are no other associated labels yet, no rules within Associated Label Weight Rulebase 2216 fires. Subroutine 2214 would then calculate all of the associated label weights for all of the labels selected so far, but on this first round none would be calculated. The program proceeds to a process box 2218 where all of the selected associated label weights of the labels selected so far are summed, and the progress is displayed on a terminal as indicated by output box 2220. On the first round, the Sum of all selected label weights becomes the weight of the single selected label, and the display provided by output box 2220 would simply be the single weight of the first select label. As indicated in FIG. 9, the first selected label could really be any of the seven labels, except for the Environment label, which must be the last label selected so that the system time/date stamp can be added to make the label unique.

The program then proceeds to a subroutine 2222 where the subroutine checks the label weights selected so far are evaluated for acceptance based upon the set of rules setup in a Label Weight Acceptance Rulebase 2224. The appropriate one or ones of the stored rules will fire depending upon the label weights, the label weight sum and an internal threshold value set by the organizational policy. However, on the first round, the total weight being only the one label is under the maximum allowed weight. Thus, the user is given the option as the program branches back to input box 2210 of quitting, selecting a different label from any of the categories, or accepting the existing associated selections. On the other hand, should the result be over the maximum allowed weight, which for the first selected label would be rare, the program causes an error message to be displayed on the terminal as indicated by display box 2226. Nevertheless, should this the weight be over the maximum allowed weight, the program still gives the user the option to choose to quit, to select a new label or accept the existing associated label selections in input box 2210.

If the user chooses at input box 2210 to select a new label from a different category, then the program proceeds to process box 2212 once again where the sum of the label weights is initialized to zero. Now there will be two labels and any affected rules in subroutine 2216 will fire and subroutine 2214 will thereupon calculate the new associated weight of the now two selected labels. The program then proceeds to process box 2218 where a new sum of the weights is calculated and then to subroutine 2222 where the weights are evaluated for acceptance based upon which rules fire in subroutine 2224. Again, if the evaluation is found to be unacceptable, then an error message is shown to the user as indicated in box 2226, and the program returns to input box 2210.

The process continues until the user has selected all of the desired labels and has elected to accept the existing labels in input box 2210. If all labels have been accepted by the user, the program branches down to a decision box 2228 where a check is made to determine if in fact a label from each category has been selected. If not, then the program branches back to input box 2210. If so, then the program branches to a decision diamond 2230 where the program asks if the weights have been accepted by Label Weight Rulebase 2224. It is noted that there may or may not be a requirement to select all of the labels, depending upon the rules in Label Weight Acceptance Rule Base 2224 and how decision diamond 2228 is set up. If the weights have not been accepted, then the program branches back to input box 2210. If they have been accepted, then the program continues to a process box 2232 where the user can input a drop dead period. The program then continues to a process box where the record transaction is recorded to an audit trail, to an Output to Disk box 2236 where the program writes associated labels with the association drop dead date to the next available database record, and then to a subroutine return box 2238 where the program branches back to the main program.

If at any time the user accepts the option to quit in box 2210, the program branches to process box 2240 where the Label Selection Process is aborted and then to subroutine return box 2242 where the program returns to the main program.

The present invention has now been described with respect to a presently preferred embodiment with some descriptions of alternatives. However, additional embodiments and variations of the present embodiment would be apparent to those skilled in the art.

I claim:

1. A cryptographic system comprising
   means for retrievably storing a data key;
   a communicating element that includes means for retrieving said data key from said retrievably storing means, means for receiving an input from a user, means which manipulates information, means for storing information, and means for storing and manipulating a message of digital information, said message having a header and a trailer;
   a program having a plurality of parts and which controls said communicating element, said program being stored in said storing means, being accessible by said communicating element and capable of being run by said communicating element, said program including at least a first, unsecure section that can be accessed without any security and a second, secure section,
   said first program section includes
   means for directing said communicating element to retrieve said data key,
   means for receiving an input passphrase from a user, said passphrase comprising at least one password, and
   means for granting access to said second, secure program section based on said input passphrase and said data key;

said second program section includes
   means for creating a message trailer having a known number of total bytes if access thereto has been granted by said access granting means of said program, said trailer being divided into a plurality of individually accessible components, each component having a known number of bytes, and
   means for attaching said message trailer to said message.

2. A cryptographic system as claimed in claim 1 wherein said communicating element is a computer and said program is a computer program that can be run by said computer.

3. A cryptographic system as claimed in claim 2 wherein said computer program further includes means for creating a unique file encryption key form information contained within said message trailer.

4. A cryptographic system as claimed in claim 2 wherein computer program further includes means for assigning program code representing a plurality of reasons for creation and use of said data key.

5. A cryptographic system as claimed in claim 4 wherein said computer program further includes means for identifying said reasons for each key created prior to the creation of said key.

6. A cryptographic system as claimed in claim 4 wherein said program code includes a plurality of individually addressable labels;
   and wherein said computer program further comprises means for rekeying at least one variable in said computer program used to encrypt at least one of said labels and data key.

7. A cryptographic system as claimed in claim 2 wherein each of said message trailer accessible components is a label portion, and all said label portions are a plurality of concatenated identifiable label portions, each label portion containing rational data.

8. A cryptographic system as claimed in claim 7 and further including a data base containing a plurality of label strings and a plurality of corresponding weighting factors, each said label portion being an encrypted said label string;
   and said message trailer creating means including means to permit a user of said cryptographic system to access said data base and to select a label string.

9. A cryptographic system as claimed in claim 7
   wherein the information in at least one of said label portions can be either logically related or logically unrelated to the information in at least another of said label portions; and
   wherein said computer program further includes means for assigning a weighting factor to each of at least two of said label portions, said weighting factor of each label portion being based on the information in such label portion; and
   said cryptographic system further including expert system means for evaluating said weighting factors of said label portions to determine if the information in a particular selected label portion is logically related to the information in another selected label portion and thus the combination of said particular selected label portion with said another selected label portion is a permitted combination of label portions.

10. A cryptographic system as claimed in claim 2 wherein said computer program further includes means for individually addressing said label portions.

11. A cryptographic system as claimed in claim 2 wherein said computer program further includes
   means for receiving a message having a trailer; and means for individually addressing said message label portions and extracting information contained in said message label portion.

12. A cryptographic system that manipulates a message of digital information having a trailer in which a plurality of individually retrievable labels are located, said cryptographic system comprising:

a data key storage means for retrievably storing a data key;

a label storing means for individually, retrievably storing a plurality of labels, each label containing rational information relevant to the message;

an input means for providing an input passphrase from a user, said passphrase comprising at least one password;

a communicating element that manipulates, stores and retrieves the message; and a program which directs the operation of said communicating element, said program having a plurality of instruction sets including:

an instruction set which directs said communicating element to retrieve said data key from said data key storage means, an instruction set which directs said communicating element to receive said input passphrase, an instruction set which directs said communicating element to use said data key and said input passphrase to determine if the user should be granted access to further parts of the program, an instruction set which directs said communicating element to manipulate said data key and said input passphrase to generate a global vector, an instruction set which directs said communicating element to utilize said global vector for encrypting each label, an instruction set which directs said communicating element to utilize said global vector for decrypting each label, an instruction set which directs said communicating element to use two of said plurality of labels and said global vector to generate a message key, and an instruction set which directs said communicating element to use said message key with an encryption/decryption algorithm to manipulate the message.

13. A cryptographic system as claimed in claim 12 wherein said cryptographic system is capable of decrypting an encrypted message of digital information having a trailer in which a plurality of labels are located so as to be individually retrievable, said program further including an instruction set for locating said plurality of labels in the encrypted message trailer, and for retrievably storing each label.

14. A cryptographic system as claimed in claim 13 wherein said program further includes an instruction set for creating a plurality of labels, each label having a known number of bytes, and an instruction set for attaching said labels when encrypted at a known location as a message trailer to said message.

15. A cryptographic system as claimed in claim 14 wherein said computer program further comprises an instruction set for rekeying at least one variable in said program, said rekeyed variable being used to encrypt at least one of said labels and said data key.

16. A cryptographic system as claimed in claim 14 wherein said message trailer is comprised of a plurality of concatenated, identifiable and addressable label portions.

17. A cryptographic system as claimed in claim 16 and further including a data base containing a plurality of label strings and a plurality of corresponding weighting factors, each said label portion being an encrypted said label string;

and said instruction set that creates the message trailer including a subset of instructions to permit a user of said cryptographic system to access said data base and to select a label string depending upon the corresponding weighting factors.

18. A cryptographic system as claimed in claim 17 and further including an expert system means for evaluating said weighting factors of the user selected label strings to determine if the combination of selected label strings is a permitted combination.

19. A cryptographic system as claimed in claim 12 wherein said communicating element is a computer and said program is a computer program that can be run by said computer.

20. A cryptographic system as claimed in claim 12 wherein said program instruction set that generates said global vector includes a subset of instructions that provide said global vector only if access is granted to the user.

21. A cryptographic system as claimed in claim 12 wherein said instruction set which manipulates said data key and said passphrase to generate said global vector includes a randomizer subset of instructions that provide an initializing vector, that has a plurality of bits, in a shift register means and provide a spinup number, and which enter digital data to be manipulated into one end of the shift register means, take two of said bits in said shift register and exclusive OR them together, and then load a product of the exclusive OR'd product in said one shift register end shifting all of the numbers in the shift register, and then repeating the loading of said one shift register end a predetermined number of times equal to a factor of said spinup number.

22. A cryptographic method of manipulating a message of digital information, said message having a portion that contains two or more individually addressable labels, each said label containing rational information relevant to the message, said method comprising the steps of:

retrieving a data key from a data key storage means;

receiving an input passphrase from a user;

manipulating said data key and said input passphrase to generate a global vector;

utilizing said data key and said input passphrase to determine if a user should be granted access to a part of a computer program;

utilizing said global vector for selectively encrypting or decrypting two or more of said labels;

utilizing two of said labels and said global vector to generate a message key; and utilizing said message key to encrypt/decrypt said message.

23. A cryptographic system comprising:

means for retrievably storing a data key;

a label storing means for individually, retrievably storing a plurality of labels, each label containing rational information relevant to a message;

an input means for providing an input passphrase from a user;

a communicating means which manipulates, storing and retrieving the message;

means responsive to said data key and said input passphrase for determining if a user should be granted access to said system;

means which manipulates said data key and said input passphrase to generate a global vector;

means for using said global vector for encrypting each said label and for attaching said labels to a portion of the message;

means for using said global vector for individually retrieving and decrypting each said label;

means for using a selected number of labels and said global vector for generating a message key; and means for using said message key for selectively encrypting or decrypting a message.

24. A cryptographic system as claimed in claim 12, wherein said instruction set which manipulates said data key and said passphrase to generate said global vector includes subsets of instructions that result in the independent initialization and validation of said input passphrase, said subsets of instructions including a first subset of instruction that receives and manipulates said input passphrase with at least a first internal vector to produce a manipulated passphrase, and a second subset of instructions that combines said manipulated passphrase with a first data key to produce a resulting first product vector;

wherein said instruction set which manipulates said data key and said passphrase to generate said global vector includes a subset of instructions that result in the independent generation of a second product vector, said subset of instructions including a third subset of instructions that independently receive and manipulate a second data key with at least a second internal vector that is different from said first internal vector to produce a second product vector with the result that said second product vector has been independently generated; and wherein said instruction set which manipulates said data key and said passphrase to generate said global vector includes a subset of instructions that result in an interdependent verification and validation of said global vector, said subset of instructions including a fourth subset of instructions that compare said first and second product vector and upon a favorable comparison provide said global vector with a result that said global vector has been validated by an interdependent verification.

25. A cryptographic system as claimed in claim 24, wherein said instruction set which manipulates said data key and said passphrase to generate said global vector includes a subsets of instructions that utilize a stored initialization data vector and a further subset of instructions that utilize a stored initialization verification vector.

26. A cryptographic system as claimed in claim 25, wherein said instruction set which manipulates said data key and said passphrase to generate said global vector includes subsets of instructions to generate said data vector and verification vector by using different initialization vectors.

27. A cryptographic system as claimed in claim 12 wherein said instruction set which directs said communicating element to utilize said global vector for encrypting each label utilizes a subset of instructions which select and permutate a rational label bv utilizing independently derived and isolated input vectors.

28. A cryptographic system as claimed in claim 12 wherein said instruction set which directs said communicating element to utilize at least two of said plurality of labels and said global vector to generate a message key utilizes a subset of instructions which select and permutate a rational label bv utilizing independently derived and isolated input vectors.

* * * * *